United States Patent
Yano et al.

(10) Patent No.: US 12,301,295 B2
(45) Date of Patent: May 13, 2025

(54) COMMUNICATION SYSTEM AND METHOD FOR CONTROLLING COMMUNICATION SYSTEM

(71) Applicant: NEC Corporation, Tokyo (JP)

(72) Inventors: Yutaka Yano, Tokyo (JP); Yoshihisa Inada, Tokyo (JP); Takehiro Nakano, Tokyo (JP); Ryuji Aida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 18/022,932

(22) PCT Filed: Sep. 27, 2021

(86) PCT No.: PCT/JP2021/035227
§ 371 (c)(1),
(2) Date: Feb. 23, 2023

(87) PCT Pub. No.: WO2022/071167
PCT Pub. Date: Apr. 7, 2022

(65) Prior Publication Data
US 2023/0344521 A1    Oct. 26, 2023

(30) Foreign Application Priority Data
Sep. 30, 2020   (JP) ................................. 2020-164837

(51) Int. Cl.
*H04B 10/524*    (2013.01)
*H04B 10/071*    (2013.01)
(Continued)

(52) U.S. Cl.
CPC ......... *H04B 10/524* (2013.01); *H04B 10/071* (2013.01); *H04B 10/077* (2013.01); *H04J 14/02* (2013.01); *H04J 14/08* (2013.01)

(58) Field of Classification Search
None
See application file for complete search history.

(56) References Cited

U.S. PATENT DOCUMENTS

| 7,853,151 B2 * | 12/2010 | Izumi | H04B 10/2572 398/159 |
| 2004/0234217 A1 * | 11/2004 | Shahar | H04B 10/299 385/122 |

(Continued)

FOREIGN PATENT DOCUMENTS

| EP | 2938014 A1 | 10/2015 | |
| GB | 2268017 A * | 12/1993 | ........... H04B 10/035 |

(Continued)

OTHER PUBLICATIONS

Extended European Search Report for EP Application No. 21875469.5, dated on Mar. 1, 2024.

(Continued)

*Primary Examiner* — Li Liu
(74) *Attorney, Agent, or Firm* — Sughrue Mion, PLLC

(57) ABSTRACT

In order to avoid the phenomenon of communication being impeded and signals transmitted by the plurality of slave devices overlapping, a communication system according to the present invention has the first master device transmits a first pulsed light to the first transmission path and receives a return light of the first pulsed light from the second transmission path; each of the slave devices modulates the first pulsed light, and outputs the modulated first pulsed light as the return light of the first pulsed light; and the width of the first pulsed light is narrower than double the shortest distance from among the transmission distance between the slave device outputting the return light and the transmission distance between the first master device and the slave device outputting the return light.

17 Claims, 27 Drawing Sheets

(51) Int. Cl.
*H04B 10/077* (2013.01)
*H04J 14/02* (2006.01)
*H04J 14/08* (2006.01)

(56) References Cited

U.S. PATENT DOCUMENTS

| | | | | |
|---|---|---|---|---|
| 2005/0259264 | A1* | 11/2005 | Munehira | H04B 10/0771 356/450 |
| 2005/0259998 | A1* | 11/2005 | Fujieda | H04B 10/0777 398/186 |
| 2015/0256251 | A1* | 9/2015 | Tamura | H04B 10/071 398/13 |
| 2015/0318926 | A1* | 11/2015 | Zhang | H04B 10/0779 398/183 |
| 2018/0356338 | A1* | 12/2018 | Tanaka | G01N 21/39 |
| 2022/0397448 | A1* | 12/2022 | Pilipetskii | H04B 10/071 |

FOREIGN PATENT DOCUMENTS

| | | | |
|---|---|---|---|
| JP | H05-344067 | A | 12/1993 |
| JP | H07-202813 | A | 8/1995 |
| JP | 3307334 | B2 | 7/2002 |
| JP | 2005-331342 | A | 12/2005 |
| JP | 2006313782 | A * | 11/2006 |
| JP | 2012-257020 | A | 12/2012 |
| JP | 2015-170871 | A | 9/2015 |
| WO | 2008/116309 | A1 | 10/2008 |

OTHER PUBLICATIONS

International Search Report for PCT Application No. PCT/JP2021/035227, mailed on Dec. 14, 2021.
English translation of Written opinion for PCT Application No. PCT/JP2021/035227, mailed on Dec. 14, 2021.

* cited by examiner

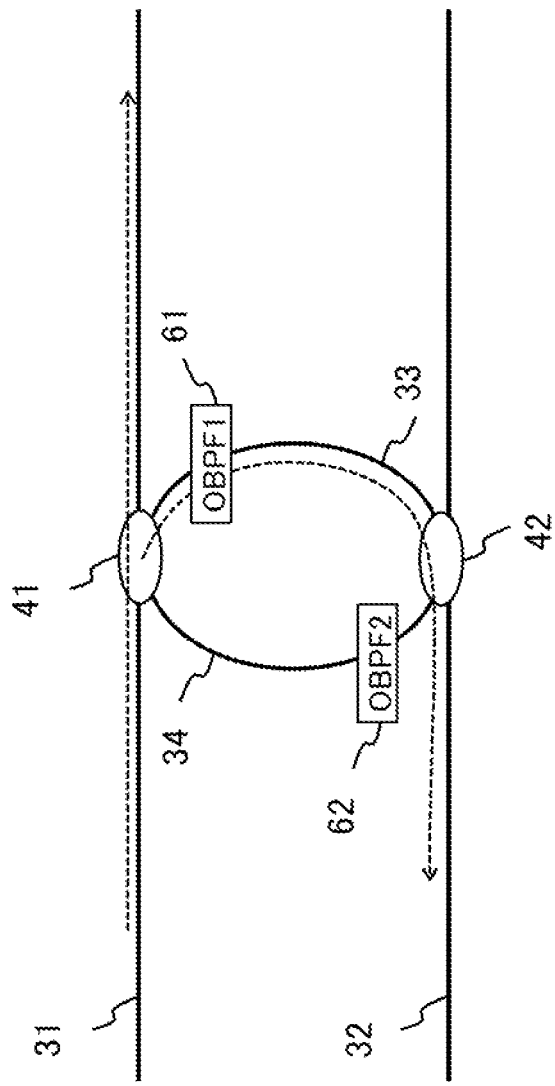

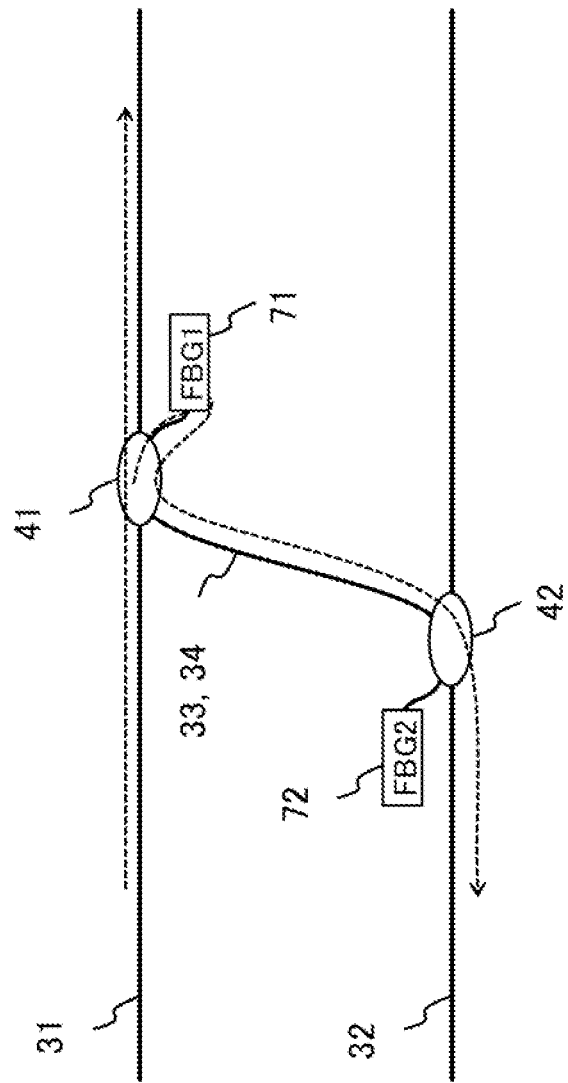

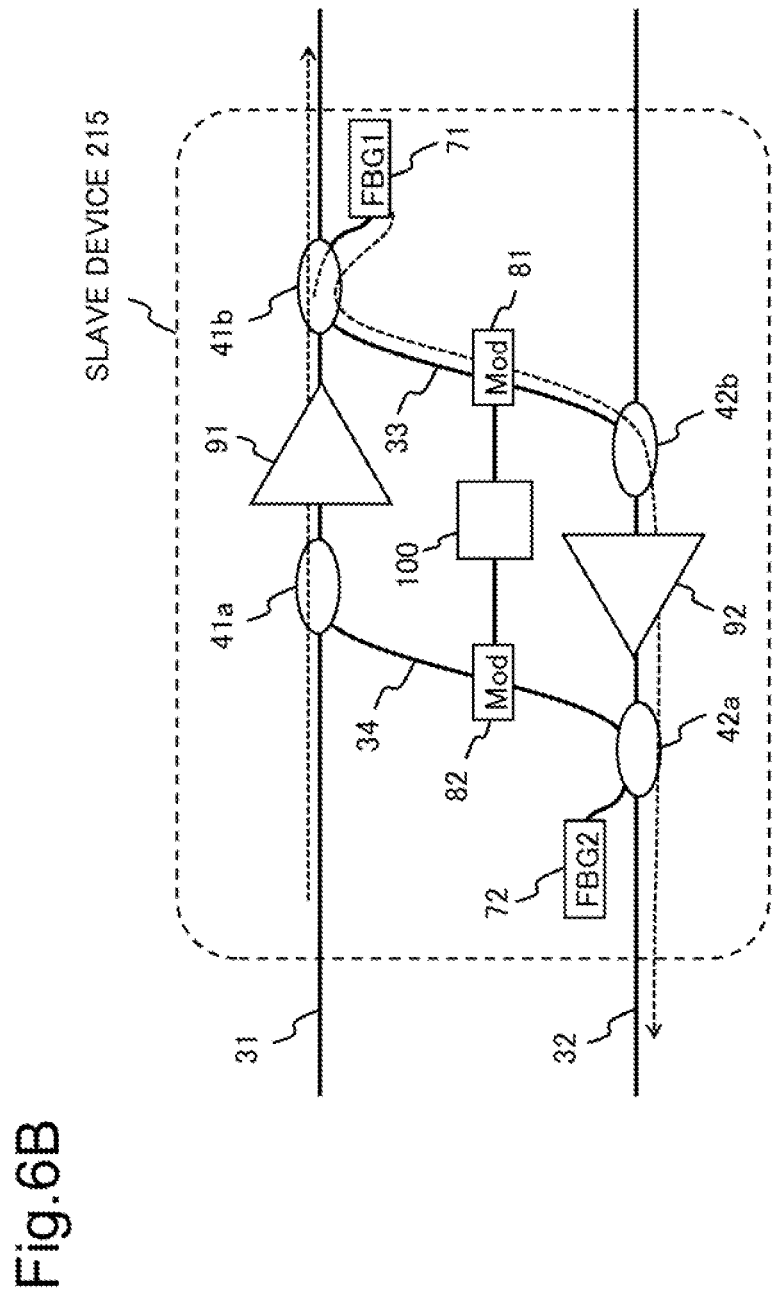

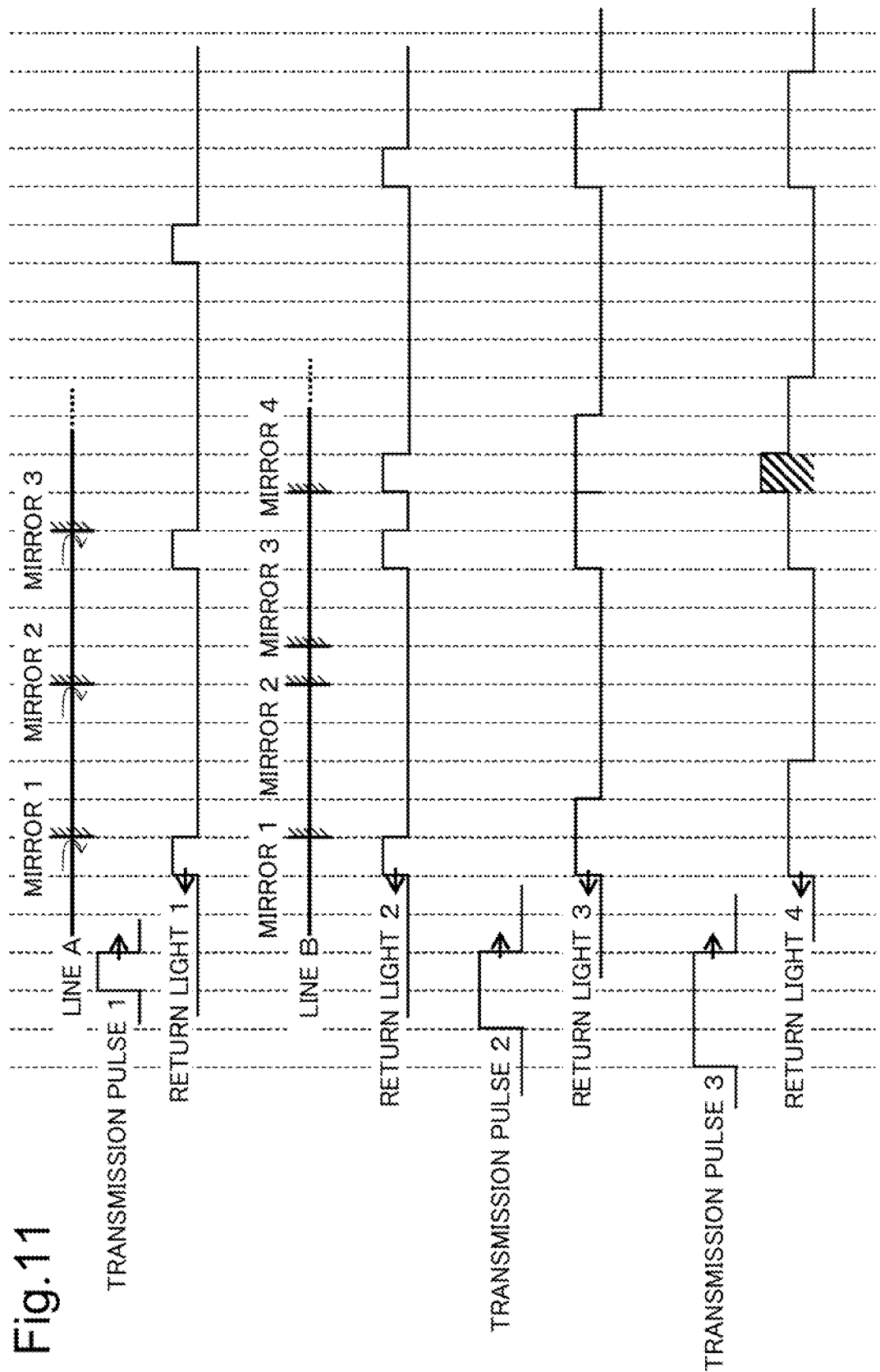

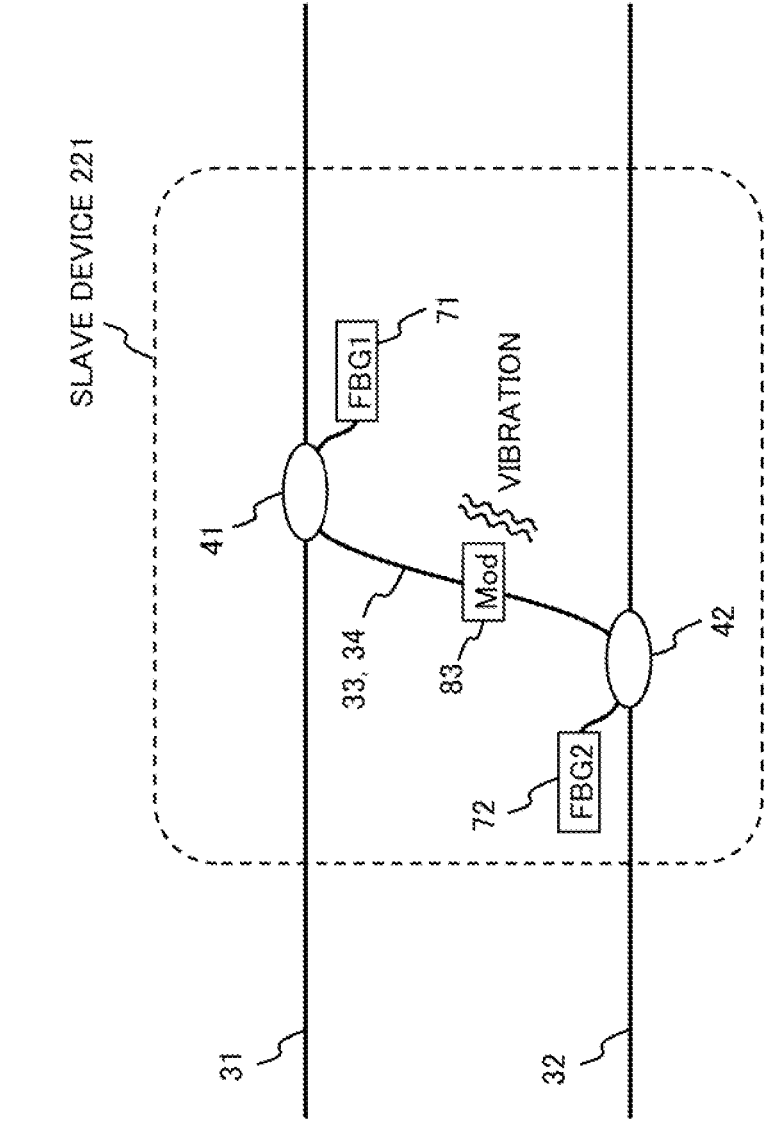

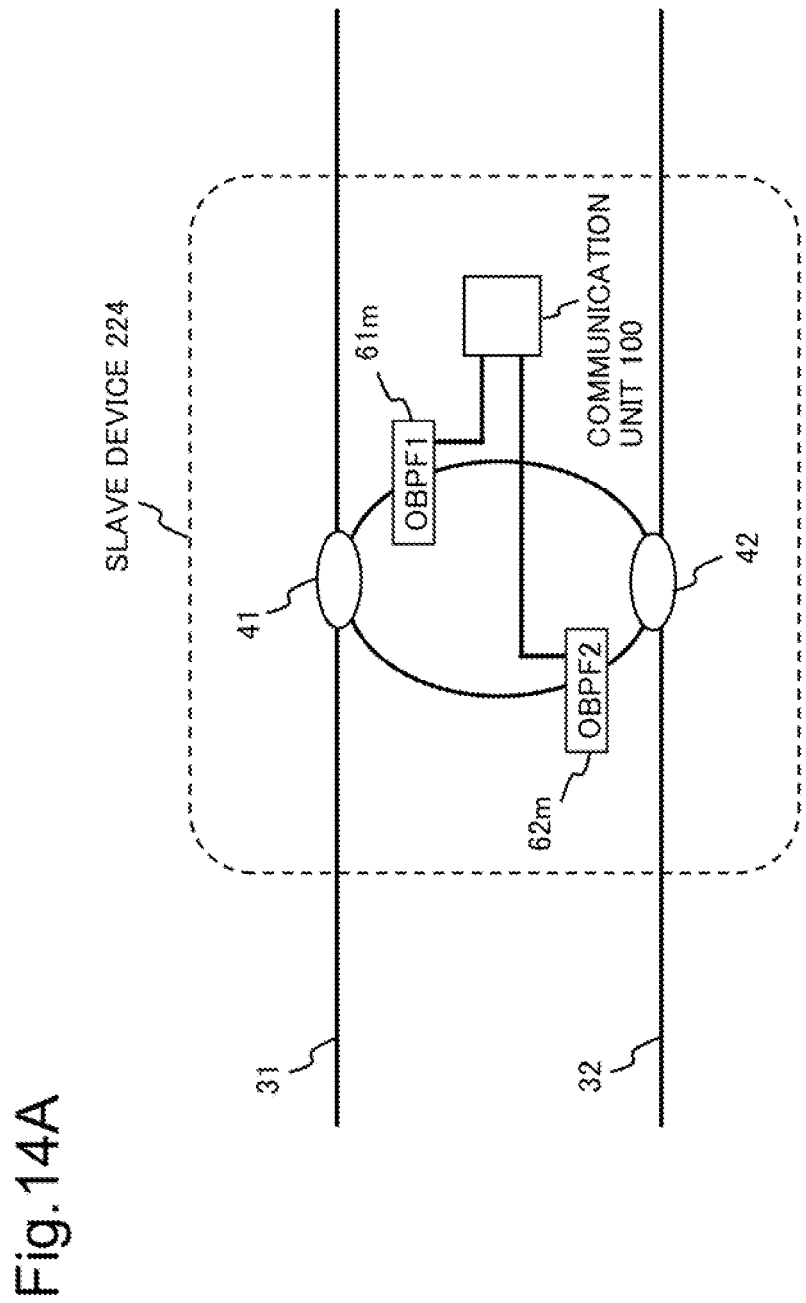

COMMUNICATION SYSTEM AND METHOD FOR CONTROLLING COMMUNICATION SYSTEM

This application is a National Stage Entry of PCT/JP2021/035227 filed on Sep. 27, 2021, which claims priority from Japanese Patent Application 2020-164837 filed on Sep. 30, 2020, the contents of all of which are incorporated herein by reference, in their entirety.

TECHNICAL FIELD

The present disclosure relates to a communication method with respect to a remote device connected by an optical fiber communication line.

BACKGROUND ART

[Communication Method with Respect to Plurality of Remote Devices]

A communication system constituted of a master device, and a plurality of slave devices that communicate with the master device is considered. In a viewpoint of real-time performance of communication, it is ideal to provide a one-to-one communication line between the master device and a slave device. However, a high cost is required, because receivers of the number equal to the number of the slave devices are necessary for the master device. In view of the above, for a purpose in which strict real-time performance is not necessary, a communication method is employed, in which one line is shared by a plurality of slave devices, and transmission is performed while shifting a timing from one another. This is also called time division demultiplexing method.

In the time division demultiplexing method, roughly, two methods are known regarding transmission timing control between slave devices. One is a method in which a transmission timing is controlled in such a way that a signal is not output simultaneously from a plurality of slave devices. Another is a method in which a slave device transmits at any time, and in a case in which signals overlap one another (this is called a collision), transmission is performed again after a certain time elapses.

Any of these methods require some kind of control. As a method for achieving control of a transmission timing, a method in which a master device transmits an inquiry command to a specific slave device in order, and successively receives a response is known as a typical method. In order to achieve this, a mechanism is necessary in which a unique number is allocated to each slave device, and each slave device detects, based on the number, that an inquiry signal is addressed to the own device. Further, the master device needs to recognize all numbers of slave devices to be monitored.

Another method in which transmission is performed again when a collision is detected is suitable for wireless communication, but is rather unsuitable for optical fiber communication. In wireless communication, a slave device itself can detect that transmission has also been performed from another slave device at a time of transmission by the own device and a collision has occurred. However, in particular, in optical fiber communication using an optical amplification repeater, since a configuration in which an upstream line and a downstream line are separated is customary, occurrence of a collision is needed to be informed from a master device, which deteriorates communication efficiency.

[Monitoring Method for Optical Amplification Repeater Device in Optical Fiber Communication System]

PTL 1 describes one example of a monitoring method for an optical amplification repeater device in an optical fiber communication system. An optical amplifier amplifies wavelength multiplexed light all at once. The wavelength multiplexed light also includes a monitoring signal from a monitoring master device in a terminal station. A part of an output from the optical amplifier is split, and only a monitoring signal wavelength is selectively reflected on an optical fiber grating (fiber Bragg grating: FBG), passes through a return light path (also referred to as a light return path), and is multiplexed in an optical fiber core wire on the opposite side. By monitoring a level of return light of a monitoring signal received by the monitoring master device, it is possible to detect abnormality such as lowering of an output level of the optical amplifier.

Herein, a monitoring signal is pulse light. Further, an interval between optical amplification repeater devices being slave devices is several tens kilometers (typical value). Therefore, the monitoring master device can identify which repeater device a response comes from, based on a difference in time from transmitting monitoring signal light until the light is returned. This is a similar principle to optical time domain reflectometry (OTDR).

Further, since a light source for transmission and an electric circuit are not necessary in a monitoring circuit of a slave device, the above configuration is not only advantageous in terms of a cost, but also securing long-term reliability is relatively easy.

[Return Light Path]

As a return light path, a configuration as illustrated in FIGS. 1A and 1B is generally used. First, FIG. 1A is described. Although not illustrated in FIGS. 1A and 1B, for example, as illustrated in FIG. 7 to be described later, it is assumed that a terminal station including a wavelength multiplexed light transmission device and a monitoring master device is provided on left and right sides. A wavelength multiplexed optical signal is transmitted through optical fibers 31 and 32 in opposite directions to each other. The wavelength multiplexed optical signal is transmitted through the optical fiber 31 in a rightward direction from left in FIGS. 1A and 1B, and is transmitted through the optical fiber 32 in a direction opposite to the direction. In the wavelength multiplexed optical signal to be transmitted, a slave-master communication wavelength as illustrated by an example in FIG. 8 is included as a monitoring signal wavelength to be transmitted and received by the monitoring master device. A waveform of the monitoring signal is a pulse shape.

A path for a monitoring signal to be transmitted through the optical fiber 31 is described as an example. Wavelength multiplexed light to be transmitted through the optical fiber 31 is transmitted from a terminal station (not illustrated) on the left side in FIGS. 1A and 1B. A part of the wavelength multiplexed light transmitted through the optical fiber 31 is split into a return light path 33 by an optical coupler 41, and only a monitoring signal wavelength is extracted by an optical filter 61. The extracted monitoring signal wavelength is multiplexed in the optical fiber 32 by an optical coupler 42, and returns to the terminal station on the left side in FIGS. 1A and 1B. In this example, an optical band pass filter (OBPF) is used as the optical filter.

Likewise, regarding a monitoring signal transmitted through the optical fiber 32, a part of a monitoring signal being output from a terminal station on the right side in FIGS. 1A and 1B passes through a return light path 34, and returns to the terminal station on the right side in FIGS. 1A and 1B.

Herein, it is customary that wavelengths of monitoring signals to be transmitted by monitoring master devices disposed on left and right terminal stations are differentiated from each other. Passing wavelengths of the optical filters 61 and 62 are also different. This prevents the monitoring signals from circulating through the return light paths 33 and 34.

Next, a configuration of FIG. 1B is described. In this configuration, an optical fiber grating (FBG) is used in place of an optical filter. A path for a monitoring signal being output from a terminal station on the left side in FIG. 1B and transmitted through the optical fiber 31 is described as an example. A part of wavelength multiplexed light transmitted through the optical fiber 31 is split by the optical coupler 41, and enters an FBG 71. Only a monitoring signal wavelength is reflected on the FBG 71, returns to the optical coupler 41, and is split into the return light path 33. The extracted monitoring signal wavelength is multiplexed in the optical fiber 32 by the optical coupler 42, and returns to the terminal station on the left side in FIG. 1B. Likewise, a part of a monitoring signal transmitted through the optical fiber 32 passes through the return light path 34, and returns to a terminal station on the right side in FIG. 1B. In this configuration, the return light paths 33 and 34 overlap each other, and form one path.

In the configuration in FIGS. 1A and 1B, a monitoring signal wavelength turns back without being subjected to any particular operation, but even this configuration is helpful for confirmation of signal continuity up to a turning point, and for monitoring of power of the monitoring signal wavelength at the turning point. When loss at a certain point increases due to some kind of abnormality, providing a plurality of return circuits as described above at a midway of a transmission path and recording return light power in a normal state enable narrowing down of a place of occurrence.

Note that, FIGS. 2A and 2B illustrate a modification example of FIGS. 1A and 1B, and it is understood that a configuration in FIGS. 1A and 1B is a configuration in which two return light paths in FIGS. 2A and 2B are integrated, and waste is eliminated.

CITATION LIST

Patent Literature

[PTL 1] Japanese Patent No. 3307334

SUMMARY OF INVENTION

Technical Problem

In communication from a large number of slave devices to a master device, sharing a communication line is desired from an economical viewpoint, but there is a problem that transmission signals from a plurality of slave devices may overlap one another.

Solution to Problem

A communication system according to the present invention is a communication system including a first master device, and a plurality of slave devices connected to the first master device via a first transmission path and a second transmission path, wherein
  the first master device includes
    a first transmission means for transmitting first pulse light to the first transmission path, and
    a first reception means for receiving return light of the first pulse light from the second transmission path,
  each of the slave devices includes
    a first modulation means, being provided on a first return path that connects the first transmission path and the second transmission path, for modulating the first pulse light from the first transmission path, and outputting the modulated first pulse light toward the second transmission path, as return light of the first pulse light,
    first information from the plurality of slave devices to the first master device is transmitted to the first master device by the modulation, and
    a width of the first pulse light is shorter than two times a shortest distance among a transmission distance between the slave devices that output the return light and a transmission distance between the first master device and the slave device that outputs the return light.

A control method according to the present invention is a control method for a communication system including a first master device that transmits first pulse light, and a plurality of slave devices that are connected to the first master device via a first transmission path and a second transmission path and output return light of the first pulse light, the control method including:
  causing the first master device to transmit, to the first transmission path, first pulse light having a width shorter than two times a shortest distance among a transmission distance between the slave devices that output the return light and a transmission distance between the first master device and the slave device that outputs the return light;
  causing a first modulation means that is provided on a first return path within the slave device, connecting the first transmission path and the second transmission path, to modulate the first pulse light from the first transmission path, and to output the modulated first pulse light to the second transmission path, as return light of the first pulse light;
  causing the first master device to receive return light of the first pulse light from the second transmission path; and
  transmitting, to the first master device, first information from the plurality of slave devices to the first master device, by the modulation.

Advantageous Effects of Invention

The present invention provides a communication method from a plurality of slave device to a master device, having a feature that it is possible to naturally avoid a phenomenon that transmission signals from a plurality of slave devices overlap one another and communication is impaired, while sharing one communication line by the plurality of slave devices, in communication from a large number of slave devices to the master device.

BRIEF DESCRIPTION OF DRAWINGS

FIG. 1A is an explanatory diagram of a configuration of a return light path.

FIG. 1B is an explanatory diagram of a configuration of a return light path.

FIG. 6B is an explanatory diagram of a slave device (optical amplification repeater device) in the communication system according to the first example embodiment.

FIG. 11 is a timing explanatory diagram of reflected return light in a case in which a plurality of slave devices are present.

FIG. 12B is a configuration example of the communication system (in which a light input-output type vibration sensor is used as an optical modulator) according to the second example embodiment.

FIG. 14A is a second modification example of the communication system according to the second example embodiment.

EXAMPLE EMBODIMENT

Hereinafter, example embodiments according to the present disclosure are described with reference to the drawings. Note that, the following description and drawings are omitted and simplified as appropriate for clarification of description. Further, in the following drawings, same reference signs are attached to same elements, and overlapping description is omitted as necessary.

First Example Embodiment

Figure 3A:
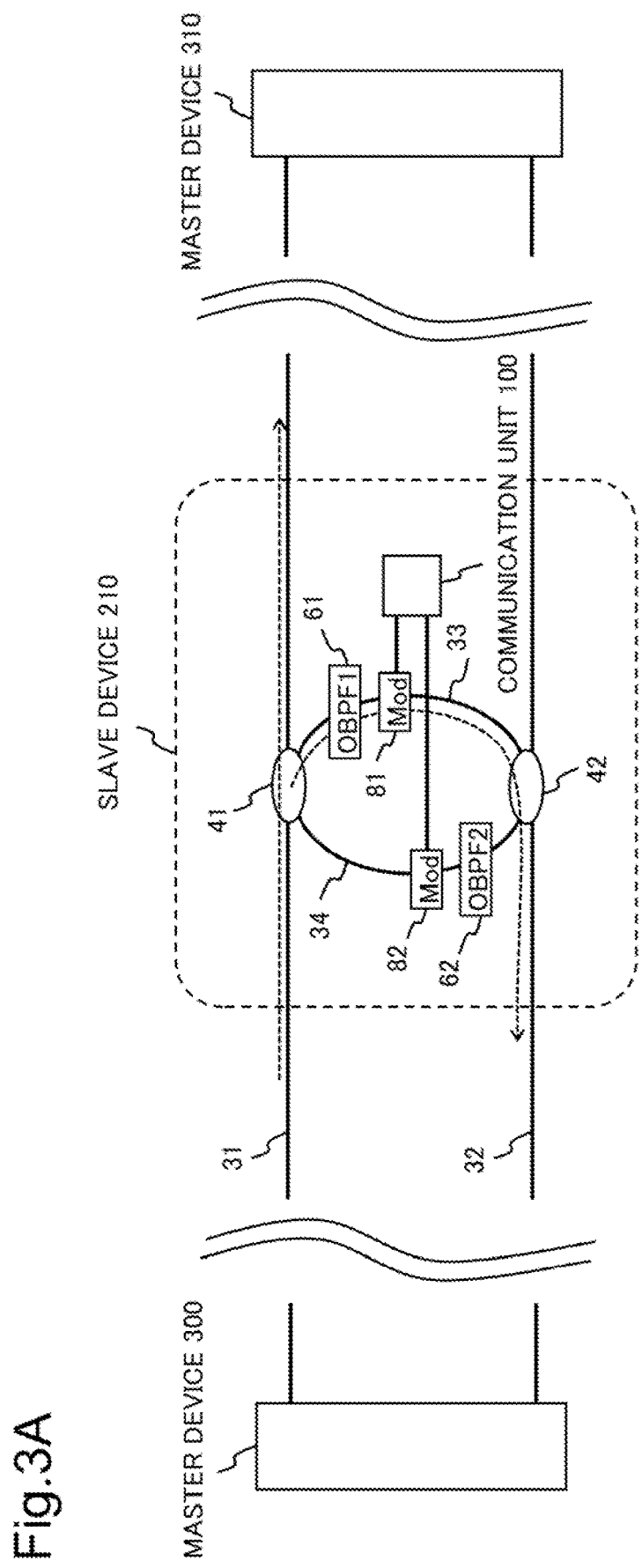
FIG. 3A is an explanatory diagram of a configuration of a slave device in a communication system according to a first example embodiment.
Figure 3B:
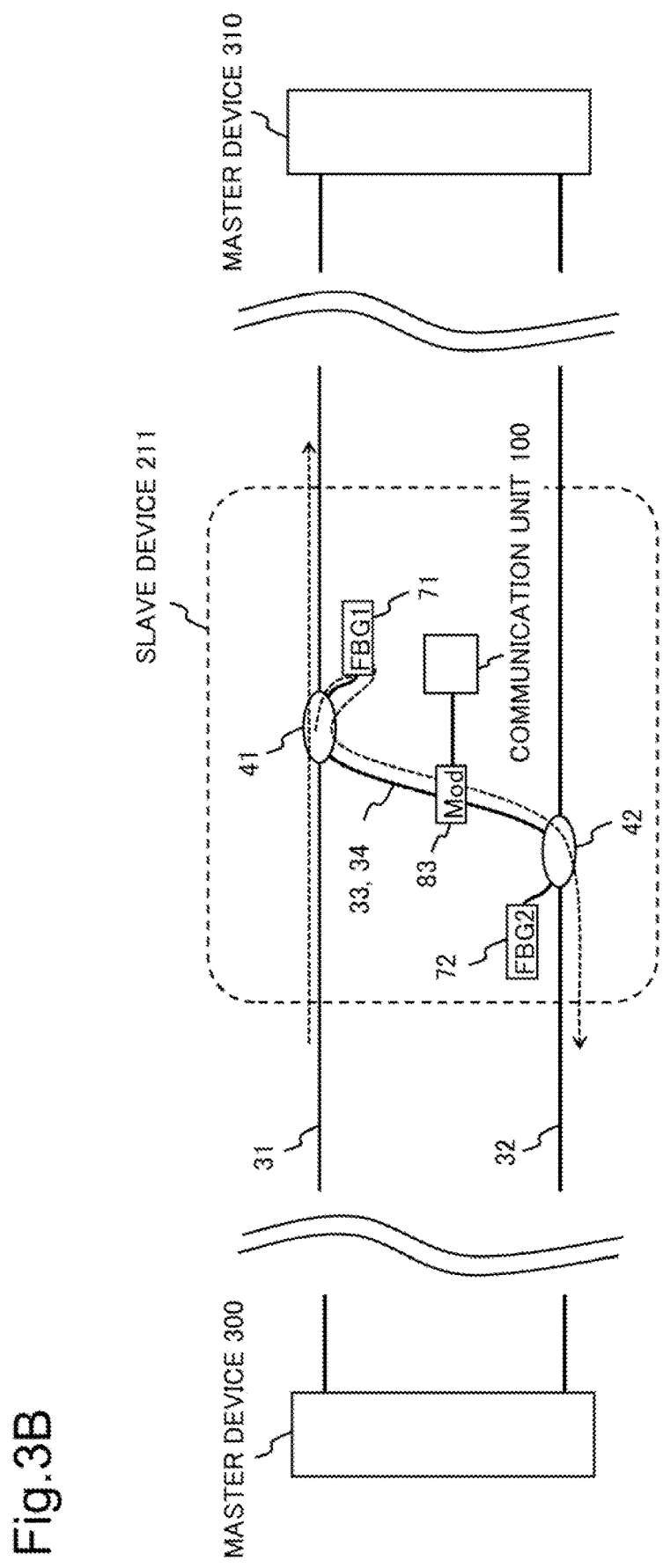
FIG. 3B is an explanatory diagram of a configuration of a slave device in the communication system according to the first example embodiment.

FIGS. 3A and 3B are a configuration example when the present technique is applied to a turn-back configuration in FIGS. 1A and 1B. It is assumed that a master device 300 is provided on a left end, and a master device 310 is provided on a right end. The return light path described in FIGS. 1A and 1B is incorporated in slave devices 210 and 211, and constitutes a part of a communication means from the slave devices 210 and 211 to a master device.

In a configuration in FIG. 3A, for example, the master device 300 on the left side transmits a light pulse of a wavelength λ1 to a slave device. Further, the master device 310 on the right side transmits a light pulse of a wavelength λ2 to the slave device. Hereinafter, this light of the wavelength λ1 or λ2 is referred to as a slave-master communication wavelength.

In the slave device 210, a communication unit 100 generates a signal to be transmitted from the slave device 210 to the master devices 300 and 310. An optical modulator 81 applies modulation to light passing through a return light path 33, based on a signal from the communication unit 100. In other words, an optical signal is transmitted from the slave device 210 to the master device 300 on the left side. An optical modulator 82 also applies modulation to light passing through a return light path 34, based on a signal from the communication unit 100. In this case, an optical signal is transmitted from the slave device 210 to the master device 310 on the right side. A modulation signal to be applied from the communication unit 100 to the optical modulators 81 and 82 may be the same or may be different from each other. This is selection as to whether information to be transmitted to the two master devices in left and right terminal stations is to be the same or differentiated from each other.

In this way, since a slave device in the communication system according to the first example embodiment illustrated in FIGS. 1A and 1B includes a modulation means for modulating return light, based on a signal from the communication unit 100, information other than an output level of a repeater can also be transmitted to a master device. Further, in the communication system according to the first example embodiment, since a slave device modulates return light of pulse light from a master device, it is not necessary to provide a light source within the slave device. Therefore, the communication system according to the first example embodiment can provide high reliability, and suppress the cost, as compared with a method in which a light source for transmission is provided in a slave device.

In description regarding FIG. 3B, description on a same operation as that in FIG. 3A is omitted. A feature of a configuration in FIG. 3B is that the return light paths 33 and 34 overlap each other. Therefore, a type of optical modulator that can apply the same modulation to light in both directions is used as an optical modulator 83 (e.g., Japanese Examined Patent Publication No. S64-10810). In this case, information to be transmitted to the two master devices in the left and right terminal stations become the same.

Figure 4:
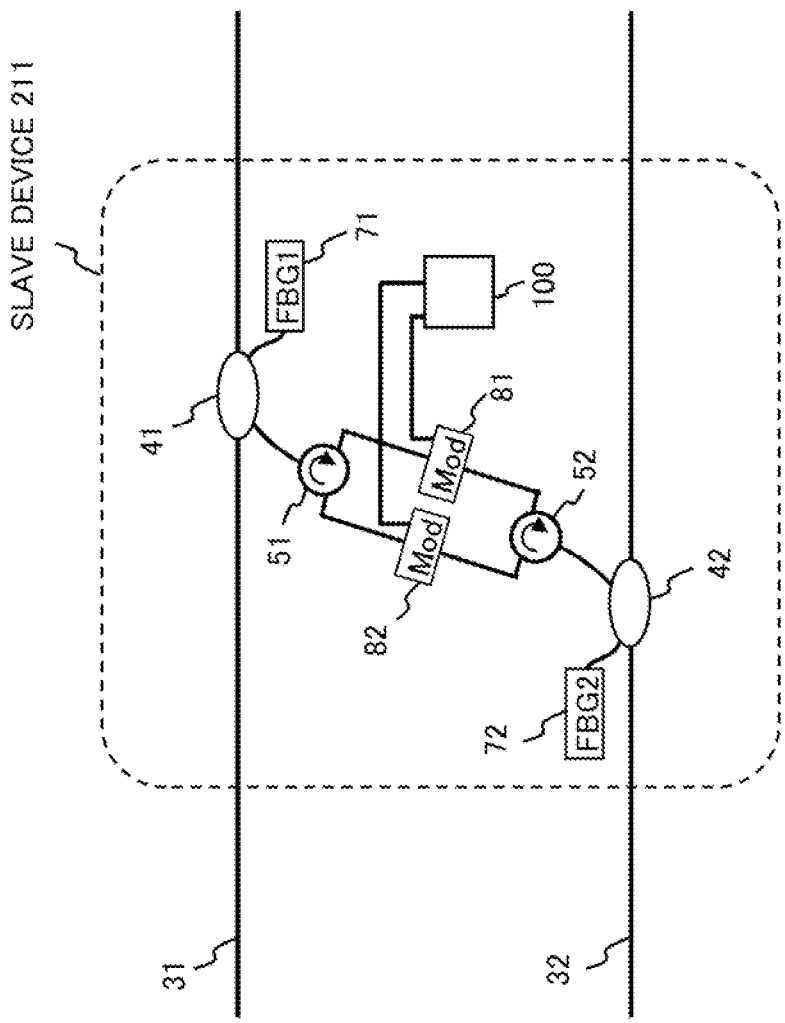
FIG. 4 is a configuration example of a bi-directional optical modulator.

In a configuration in FIG. 3B, although an optical modulator usable for both directions regarding input and output directions is necessary, two one-directional optical modulators may be combined and used as a bi-directional optical modulator, in a configuration as illustrated in FIG. 4. In this case, it also becomes possible to differentiate pieces of information to be transmitted to the two master devices in the left and right terminal stations from each other.

Figure 2A:
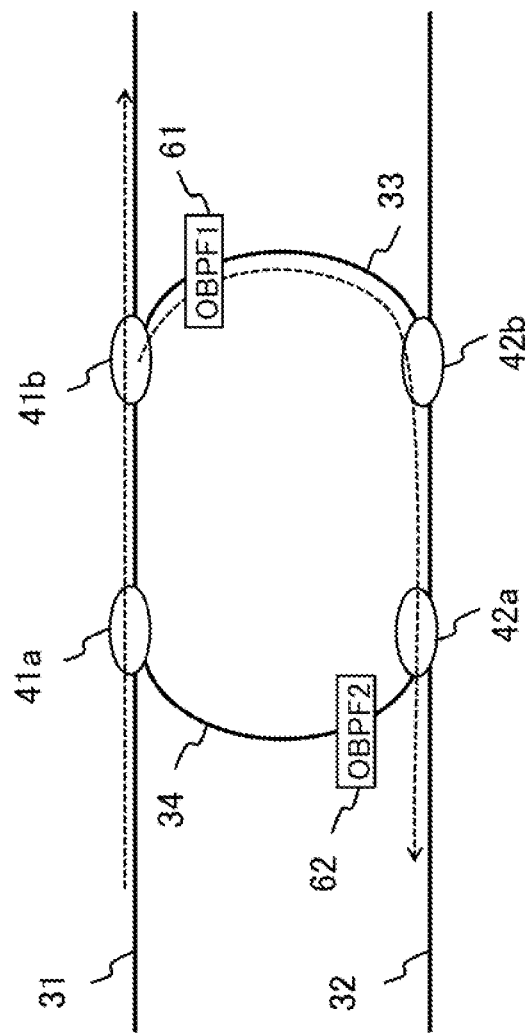
FIG. 2A is an explanatory diagram of a configuration of a return light path.
Figure 2B:
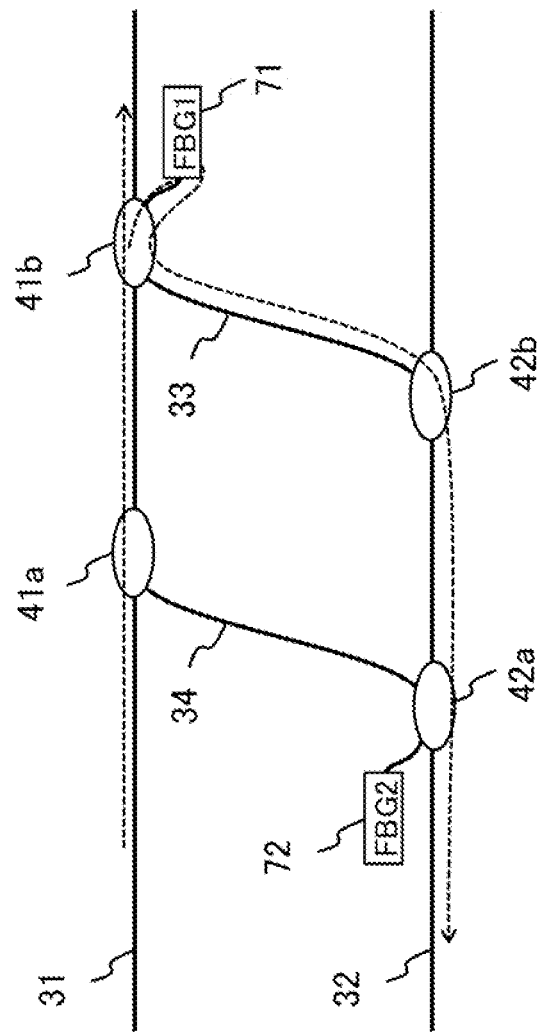
FIG. 2B is an explanatory diagram of a configuration of a return light path.
Figure 5A:
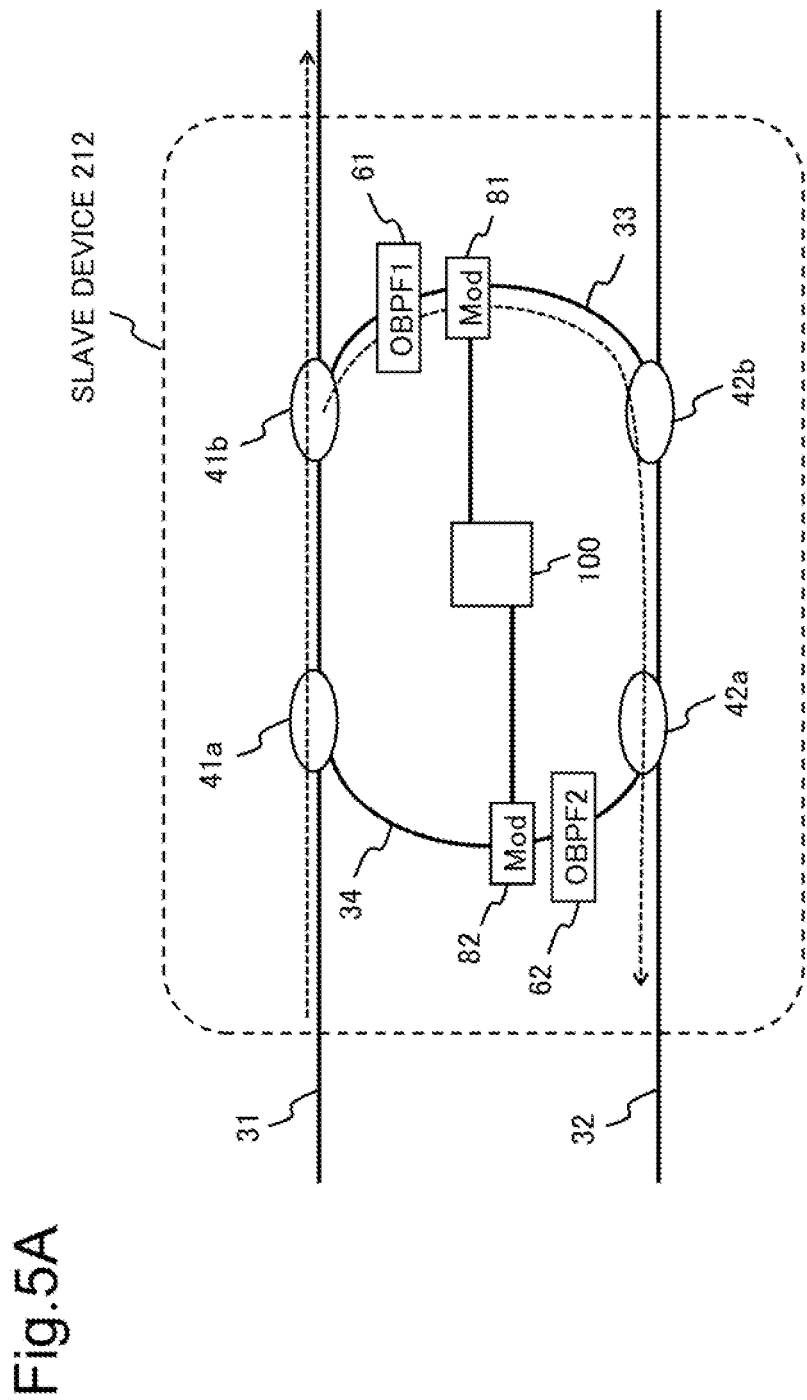
FIG. 5A is an explanatory diagram of a configuration of a slave device in the communication system according to the first example embodiment.
Figure 5B:
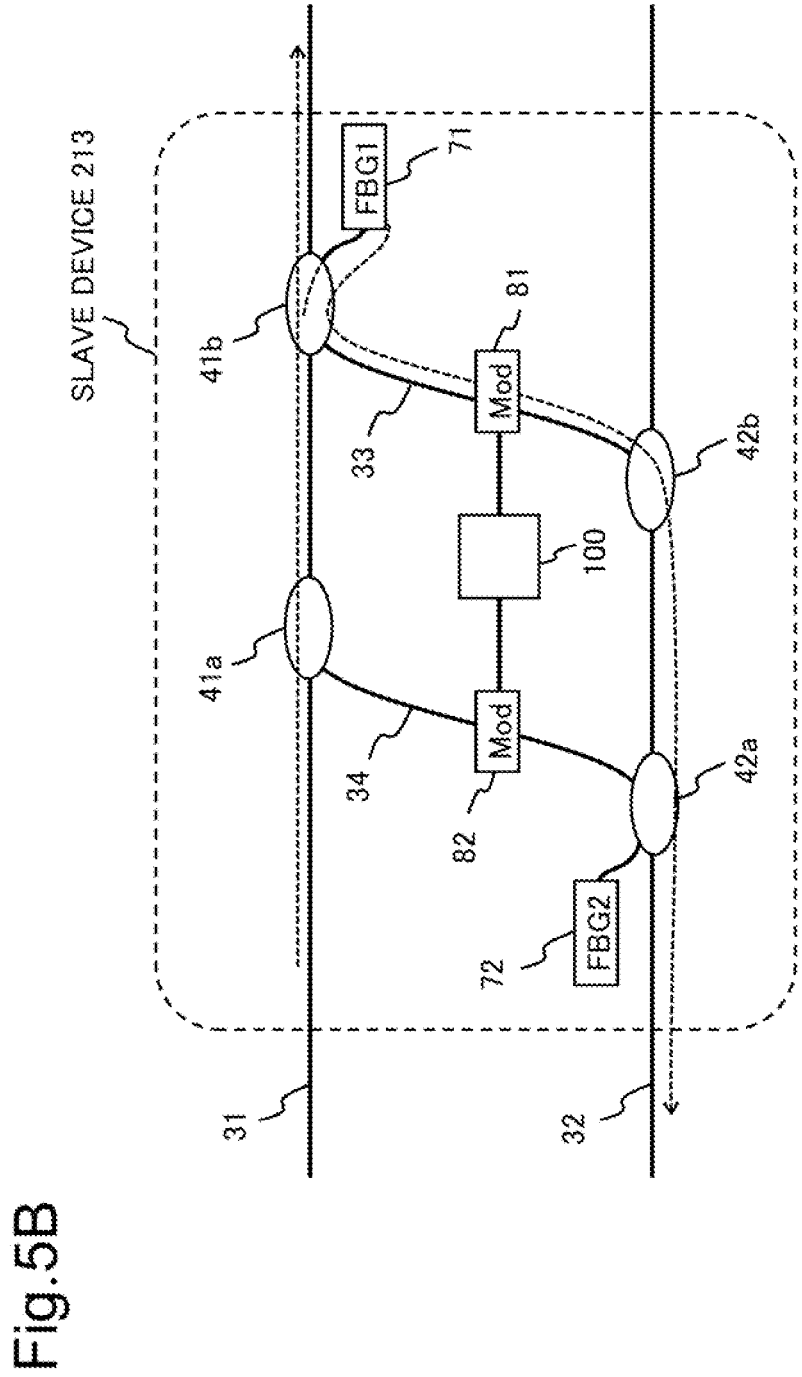
FIG. 5B is an explanatory diagram of a configuration of a slave device in the communication system according to the first example embodiment.

FIGS. 5A and 5B are an example in which the present example embodiment is applied to a configuration in FIGS. 2A and 2B. Illustration of a master device is omitted. Since an operation of slave devices 212 and 213 is similar to that in description regarding FIGS. 2A and 2B and description regarding FIGS. 3A and 3B, description thereof is omitted.

[Configuration Including Optical Amplifier]

Figure 6A:
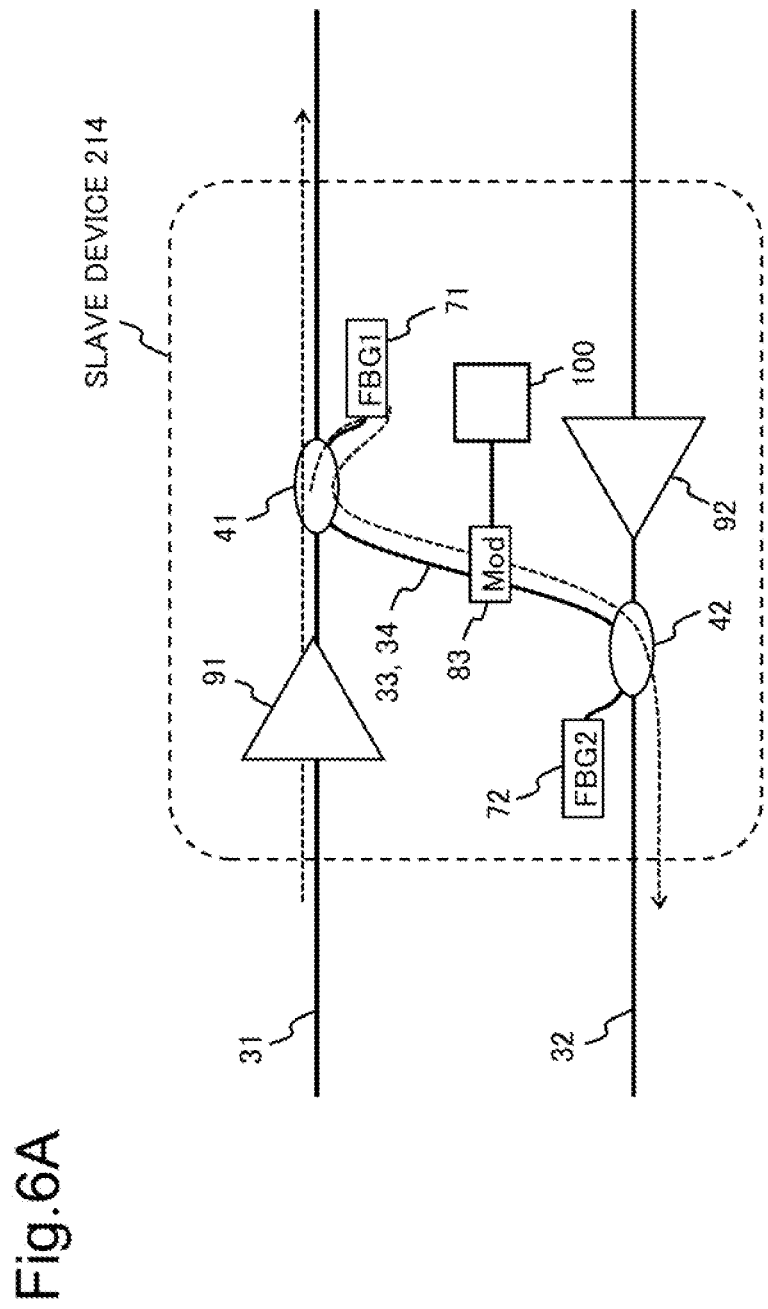
FIG. 6A is an explanatory diagram of a slave device (optical amplification repeater device) in the communication system according to the first example embodiment.

FIGS. 6A and 6B illustrate a configuration in which an optical amplifier is inserted in a slave device. Illustration of a master device is omitted. A slave device 214 illustrated in FIG. 6A illustrates a configuration in which optical amplifiers 91 and 92 are inserted in the slave device 211 illustrated in FIG. 3B. Further, a slave device 215 illustrated in FIG. 6B illustrates a configuration in which the optical amplifiers 91 and 92 are inserted in the slave device 213 illustrated in FIG. 5B. Since an FBG can easily achieve a sharp filter shape as compared with an optical band pass filter, an FBG is frequently used. Therefore, herein, only a configuration example using an FBG is described.

Since a communication operation from a slave device to a master device is similar to that in description regarding FIGS. 3B and 5B, description thereof is omitted.

These two forms are known as a form in which a part of an output of an optical amplifier is returned to an optical fiber core wire on the opposite side. A difference in the two forms can also be said to be whether a multiplexing position in a return light path is an input side or an output side of an optical amplifier. FIG. 6A illustrates a configuration in which multiplexing is performed on an output side of an optical amplifier, and FIG. 6B illustrates a configuration in which multiplexing is performed on an input side of an optical amplifier.

Figure 7:
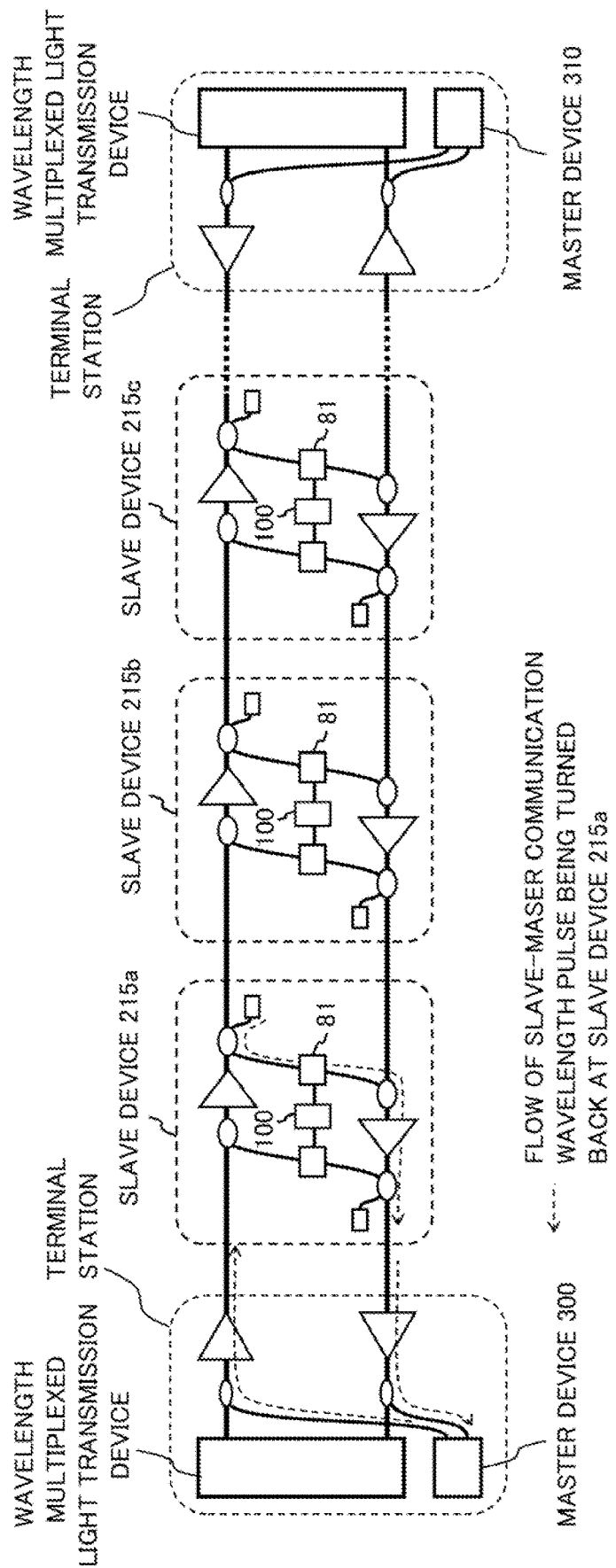
FIG. 7 is a configuration diagram of one example in which the communication system according to the first example embodiment is applied to a wavelength multiplexed light transmission system.

FIG. 7 is an example in which the present example embodiment is applied to a wavelength multiplexed light transmission system.

The wavelength multiplexed light transmission system has a configuration in which wavelength multiplexed light transmission/reception devices communicating with each other are disposed in terminal stations, and an optical amplification repeater device relays between the terminal stations. The two terminal stations communicate with each other by using two optical fiber core wires that are an upstream line and a downstream line.

In a configuration of this general wavelength multiplexed light transmission system, each optical amplification repeater device only amplifies passing light, and it is not possible to transmit information from an optical amplification repeater device. In view of the above, applying the present example embodiment enables to transmit information from each slave device to the master devices 300 and 310 by assuming that the optical amplification repeater devices are slave devices 215a, 215b, and 215c.

Figure 8:
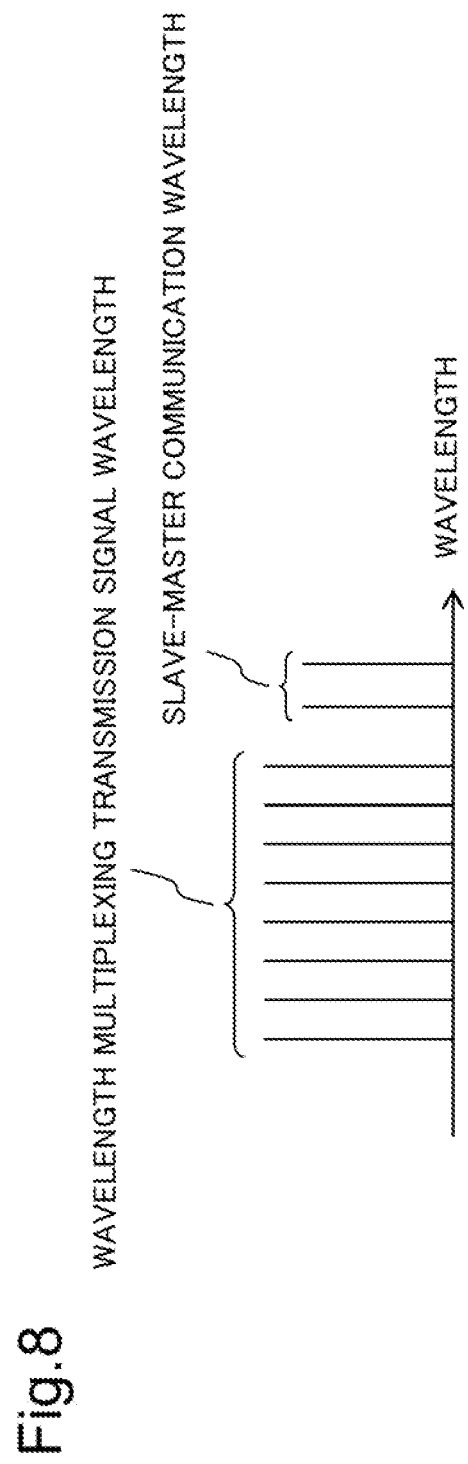
FIG. 8 is one example of wavelength arrangement in the communication system according to the first example embodiment.

The master devices 300 and 310 are disposed in terminal stations in order to communicate with the plurality of slave devices 215a, 215b, and 215c (optical amplification repeater devices) at a remote place. The master devices 300 and 310 transmit a light pulse of a slave-master communication wavelength being a wavelength different from a wavelength used for wavelength multiplexed light transmission, and receives return light from each of the slave devices. FIG. 8 illustrates one example of wavelength arrangement. Light transmitted and received by the master devices 300 and 310 is multiplexed/demultiplexed with light transmitted and received by a wavelength multiplexed light transmission device, via an optical coupler.

FIG. 7 schematically illustrates, by a dotted line, a manner in which a pulse of a slave-master communication wavelength output from the master device 300 is turned back at the slave device 215a, and returns to the master device 300.

Herein, as a configuration of a slave device, an example employing a configuration in FIG. 6B is described. In an optical amplification repeater device (slave device), optical couplers 41b and 42a are inserted in an output unit of an optical amplifier, and an FBG element (FBG 71 and FBG 72) for selectively reflecting a slave-master communication wavelength is disposed at a succeeding stage. Reflected light of a slave-master communication wavelength extracted from the optical couplers 41b and 42a is multiplexed in an optical fiber core wire on the opposite side through a reflected return light path by using optical couplers 41a and 42b, and returns to the master devices 300 and 310.

In the present invention, the optical modulators 81 and 82 are inserted in a reflected return light path, and information is transmitted from the slave device 215 to the master devices 300 and 310 by modulating reflected return light.

As illustrated in FIG. 7, providing the master devices 300 and 310 at both of the terminal stations and causing each of the slave devices to be communicable with the left and right master devices 300 and 310 enables to configure a communication line into a redundant configuration.

[Description on Timing of Return Light Pulse]

A condition on a pulse width of pulse light transmitted from a master device, an interval between return light pulses from each slave device included in return light, and the like are described by using a timing chart.

Figure 9:
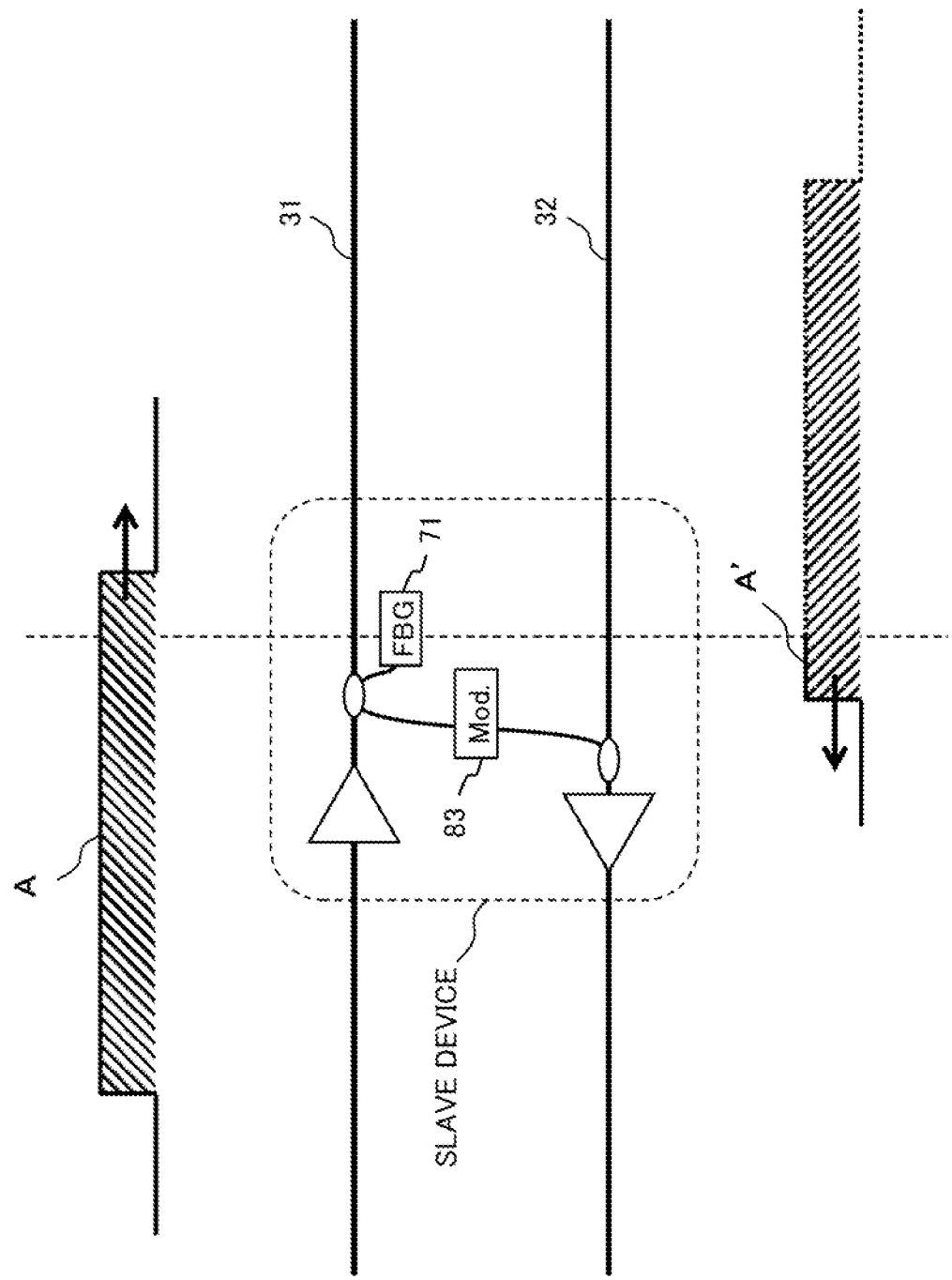
FIG. 9 is a diagram illustrating a manner of occurrence of reflected return light in a slave device.

First, a timing at which reflected return light is generated in one slave device is schematically described with reference to FIG. 9. Pulse light A transmitted from a master device is transmitted through the optical fiber 31 in a rightward direction from left in FIG. 9. Schematically, when the FBG 71 is regarded as a mirror, as illustrated in FIG. 9, it is understood that reflected pulse light A' being mirror-symmetrical to the pulse light A with respect to the FBG 71 passes through the optical fiber 32 in a leftward direction from right in FIG. 9. A pulse width of return light is the same as a pulse width of transmission light.

Figure 10:
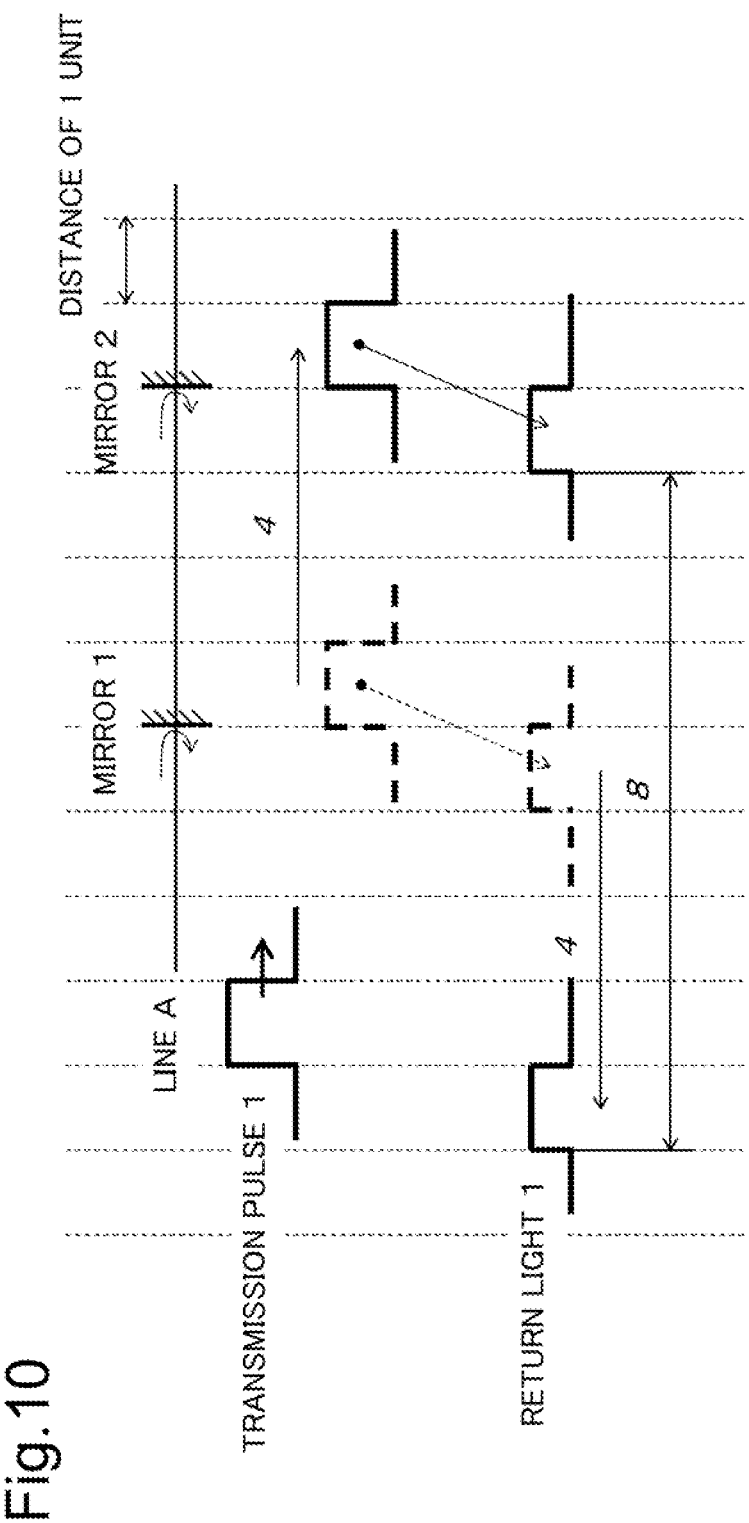
FIG. 10 is a timing explanatory diagram of reflected return light in a case in which a plurality of slave devices are present.

Next, description is made as to what extent a pulse width can be expanded, with reference to timing charts in FIGS. 10 and 11. A reason why a wide pulse width is desirable is because information can be transmitted from a slave device to a master device only in a time zone when pulse light passes through a return light path. Herein, a position of a slave device in FIG. 9 is illustrated in a simplified manner by a symbol of a partial reflective mirror. Specifically, in FIG. 10, each of a mirror 1 and a mirror 2 represents a slave device in FIG. 9. A vertical line at a constant interval represents a scale of a time unit or a distance unit, and it is assumed that one scale represents one unit.

First, with reference to FIG. 10, description is made regarding that an interval between return light pulses from adjacent mirrors becomes two times an interval between the mirrors.

On a line A, the mirror 1 and the mirror 2 are disposed at an interval of four distance units. Herein, when a transmission pulse 1 of which pulse width is one unit is transmitted, return light is generated on each of the mirrors, and is received as return light 1 by a master device. A width of pulse light included in the return light 1 is one unit, which is the same as that of the transmission pulse.

Assuming that a time when a transmission pulse reaches the mirror 1 is a time 1, a manner in which return light of a pulse is generated by the mirror 1 is depicted by a dotted line. Likewise, assuming that a time when a transmission pulse reaches the mirror 2 is a time 2, a manner in which return light of a pulse is generated by the mirror 2 is depicted by a solid line.

At the time 1, a transmission pulse is reflected on the first mirror 1, and return light starts to travel toward a transmission source. By the time t2, the transmission pulse travels to the mirror 2 by four units, and the return light also travels by 4 units. Reflected return light by the mirror 2 is newly added in this state, and starts to travel toward the transmission source. In this way, an interval of pulses appearing in the return light 1 becomes eight units, which is two times a disposition interval of the mirrors. It can also be explained that, since light reciprocates over the interval of the mirrors, an interval being equal to two times a distance between the mirror 1 and the mirror 2 is generated between return light pulses.

[Upper Limit of Transmission Pulse Width]

Next, description is made as to what extent, a pulse width can be expanded with reference to FIG. 11.

A line A illustrated in FIG. 11 is the same as the line A illustrated in FIG. 10, and mirrors are disposed at an interval of four units. Herein, when a transmission pulse 1 of which pulse width is one unit is transmitted, return light is generated on each of the mirrors, and received as return light 1 by a master device. A width of pulse light included in the return light 1 is one unit, which is the same as that of the transmission pulse, and these pulses are returned with an interval being equal to two times the interval between the mirrors.

Next, although a line B is similar to the line A, a mirror 3 is disposed one unit away from a mirror 2.

When a transmission pulse 1 of which pulse width is one unit is transmitted in a similar manner as described above, return light illustrated as return light 2 is received.

This time, a transmission pulse 2 of which pulse width is two units is transmitted on the line B. Then, return light illustrated as return light 3 is received. Since an interval between the mirror 2 and the mirror 3 is one unit, which is one-half of the pulse width of the transmission pulse 2, reflected light from the mirror 2 and return light from the mirror 3 are continued substantially without a gap. This pulse width is an upper limit.

Further, when a transmission pulse 3 of which pulse width is expanded to three units is transmitted to the line B, return light illustrated as return light 4 is received. In this case, as illustrated by an oblique hatched portion in FIG. 11, a trailing edge of return light from the mirror 2 and a leading edge of return light from the mirror 3 overlap each other.

As described above, it is understood that, in order to prevent overlapping (collision) of return light from a plurality of reflection points, a pulse width to be transmitted from a master device may be set to a width less than two times a shortest interval between adjacent slave devices. Herein, to facilitate explanation, description is made based on a premise that a transmission path is a straight line. In reality, however, a transmission path may be curved, and therefore an interval between adjacent slave devices described herein is a length of a transmission path between the adjacent slave devices. As described above, in the communication system according to the first example embodiment, it is possible to naturally avoid a phenomenon that transmission signals from a plurality of slave devices overlap one another and communication is impaired, while sharing one communication line by the plurality of slave devices, in communication from a large number of slave devices to a master device, by merely paying attention to an upper limit of a pulse width to be output from the master device.

Specific Timing Example

Herein, a distance and a time can be converted by using a speed of light within an optical fiber, which is approximately $2 \times 10^8$ (m/s). For example, in a case in which a shortest interval between adjacent slave devices is 10 km, an upper limit of a pulse width that does not overlap is slightly less than 20 km. A light pulse of a length of 20 km within an optical fiber is a light pulse having a time width of 100 microseconds.

In a case in which information is transmitted to a master device by applying, to a return light pulse, binary modulation of, for example, 1 M (bit/sec.), information of approximately 100 bits can be carried on a light pulse having a time width of 100 microseconds.

Herein, since a master device can identify, by way of an elapsed time from pulse transmission by the own device, which part of a return light pulse train being returned in a row is output from which slave device, it is not necessary to include sender identification information in the limited 100 bits. (The sender identification information may be included in the 100 bits.)

A master device constantly and repeatedly transmits pulse light. An upper limit of a repetition frequency is constrained by a reciprocating time required for light to reach a peripheral end of a line until the light returns. For example, in a case in which a total length of a line is 5000 km, since a time required for light to reciprocate is 50 milliseconds, it is necessary to set an interval of 50 milliseconds at minimum until a next pulse is transmitted. However, there are many applications for which communication at a frequency of approximately 50 milliseconds is sufficient.

Further, as a total length of a line becomes shorter, a pulse transmission interval can be made shorter.

In this way, transmission of information from a slave device to a master device according to the present example embodiment is shredded transmission in an order of microsecond in each transmission, however, the transmission has a feature that information can be repeatedly transmitted in an order of millisecond.

Repeatedly transmitting information of a same content from a slave device by utilizing this feature, and correcting missing or a code error by a master device also enables to transmit a bit number that cannot be accommodated in one return light pulse from the slave device to the master device.

As a modulation method in a slave device, any of intensity modulation, phase modulation, and polarization modulation may be employed. Further, not only binary modulation but also multi-valued modulation may be employed. In a case in which there are many slave devices to be communicated with, a cost of a modulator becomes an important factor. Further, a point that light loss of a modulator is small is also important.

For detection of return light in a master device, a distributed acoustic sensing (DAS) interrogator may be used. In particular, in a case in which phase modulation or polarization modulation is employed, the DAS interrogator is advantageous. The DAS interrogator is an OTDR measurement device, and can detect and output, in real-time, a state of a phase or polarization of return light from each point.

[Synchronization Method and Asynchronization Method]

A slave device communicates with a master device by modulating a light pulse such as 100 microseconds as described in the above-described example. Two methods are considered, namely, a method in which modulation is performed by synchronizing a timing of the modulation with a timing of a light pulse that is periodically transmitted from a master device, or the like, and a method in which modulation is constantly performed at a timing of a slave device, without synchronization, specifically, even when a light pulse does not pass through a modulator.

Each of the methods has a merit and a demerit. As a general trend, a synchronization method has good communication efficiency. Since an asynchronization method continues to modulate even when a pulse light does not pass through a modulator, a time required for all pieces of information to reach a master device is probabilistic, and communication efficiency is inferior. However, whereas a circuit on a slave device side is complicated in the synchronization method, the circuit is simple in the asynchronization method. Using complicated control or circuit may increase the number of components, which is disadvantageous in a point of securing long-term reliability.

In the synchronization method, it is necessary to synchronize a timing at which pulse light from a master device reaches a slave device, and a timing at which the slave device starts modulation by a certain method. Another circuit may be used, however, the communication unit 100 may recognize an arrival timing of pulse light by using a configuration (FIGS. 15A and 15B) of a third example embodiment to be described later, and a modulation pattern may be started in synchronization with the arrival timing.

In any case, a leading portion of one light pulse is used as a preamble of bit synchronization in reception processing of a master device. In a case of the synchronization method, it is possible to set an appropriate preamble pattern at a leading portion of a light pulse without fail.

However, in a case of the asynchronization method, which part of a modulation signal is used as a preamble cannot be predicted. Therefore, in modulation in a slave device, it is desirable to perform scrambling in such a way that a same code does not continue for a long time, or perform encoding having a strong clock component such as a Manchester coding.

Application Example: Dual Use by Time Division Operation with Repeater Output Level Monitoring Function A configuration of a slave device according to the present communication method includes a configuration for monitoring an output level of an optical amplification repeater as described in PTL 1. Therefore, it is also possible to monitor an output level of an optical amplification repeater by measuring a level of reflected return light from a slave device with high accuracy. Herein, as a monitoring wavelength, a same wavelength as a slave-master communication wavelength can be used.

When it is necessary to narrow a width of a transmission pulse, or the like to accurately measure a level of return light from a slave device, two functions may be operated in a time division manner. For example, a master device may repeat an operation of collecting information from a slave device for one minute by using the communication method according to the present invention and then monitoring an output level of an optical amplification repeater for one minute. In a case in which measurement accuracy of a level of reflected return light is impaired because intensity modulation on return light within a slave device causes a fluctuation in intensity, phase modulation may be employed as a modulation method, or the slave device may stop modulation at a time of measuring a level of reflected return light and may fix an operation point of a modulator at a minimum point of passing loss. Switching of the operation may be performed by a command instruction from a master device to a slave device, or a pulse width of a slave-master communication wavelength may be monitored by a master device, and discrimination may be made by a difference in the pulse width.

Second Example Embodiment

A second example embodiment is an example embodiment in which a light input-output type sensor is used as the modulator in the first example embodiment. Hereinafter, a point of a communication method according to the present example embodiment different from that of the first example embodiment is mainly described.

Figure 12A:
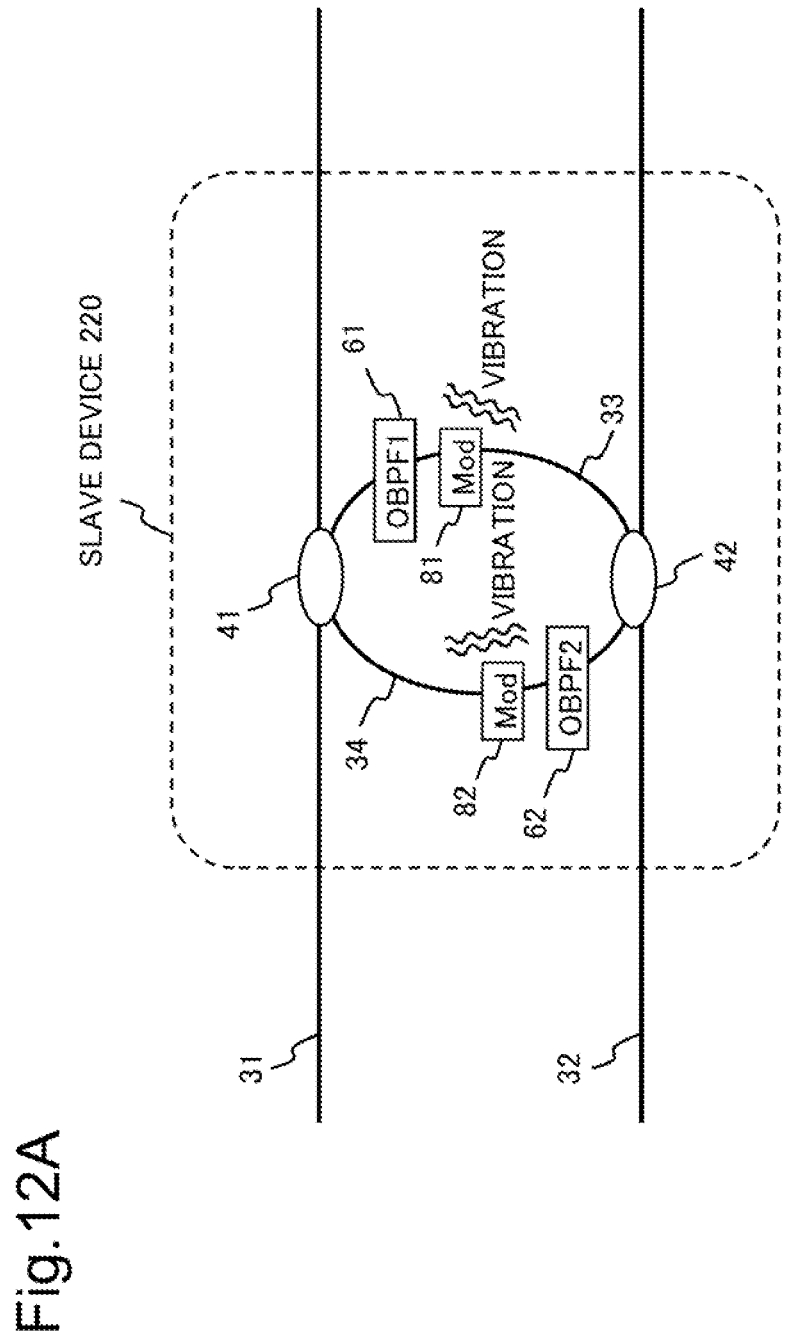
FIG. 12A is a configuration example of a communication system (in which a light input-output type vibration sensor is used as an optical modulator) according to a second example embodiment.

FIGS. 12A and 12B are an example in which the present example embodiment is added to FIGS. 3A and 3B illustrating the configuration of the first example embodiment, and optical modulators 81, 82, and 83 are light input-output type sensors. The light input-output type sensor is a sensor of a type in which input light is output after being influenced by an environment surrounding the sensor. For example, as a light input-output type sensor of a type in which vibration is sensed and loss is imparted to passing light, a sensor utilizing bending loss of an optical fiber is well-known (e.g., see Japanese Patent No. 2693674). Inserting, as a modulator, a light input-output type sensor as described above into a return light path enables to transmit, to a master device, information on vibration applied to slave devices 220 and 221. (However, in the present method, basically, communication becomes intermittent communication.)

Since demodulation/detection processing on return light from a slave device being received by a master device is the same as that of the first example embodiment, description thereof is omitted.

Further, a communication system according to the second example embodiment includes a similar configuration as that of the communication system according to the first example embodiment. Therefore, similarly to the communication system according to the first example embodiment, the communication system according to the second example embodiment can naturally avoid a phenomenon that transmission signals from a plurality of slave devices overlap one another and communication is impaired, while sharing one communication line by the plurality of slave devices, in communication from a large number of slave devices to a master device, by merely paying attention to an upper limit of a pulse width to be output from the master device.

Modification Example of Second Example Embodiment

Figure 13A:
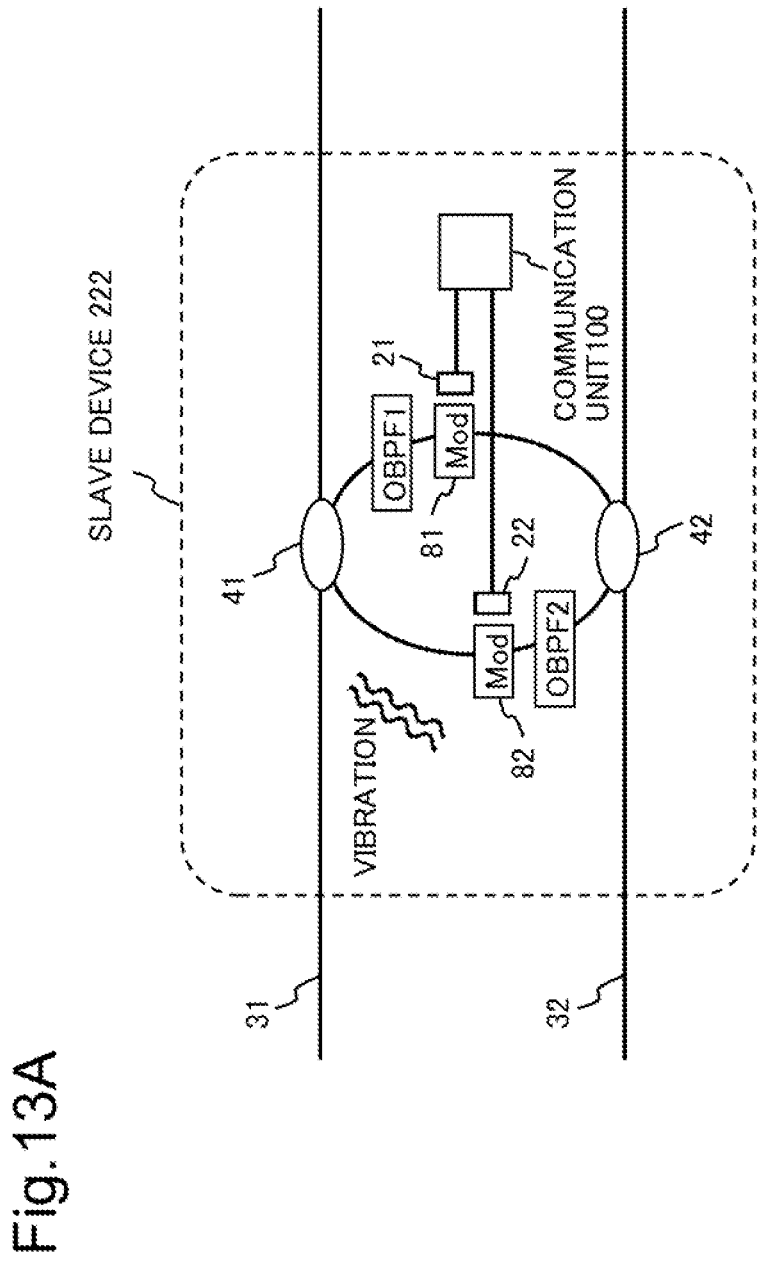
FIG. 13A is a first modification example of the communication system according to the second example embodiment.
Figure 13B:
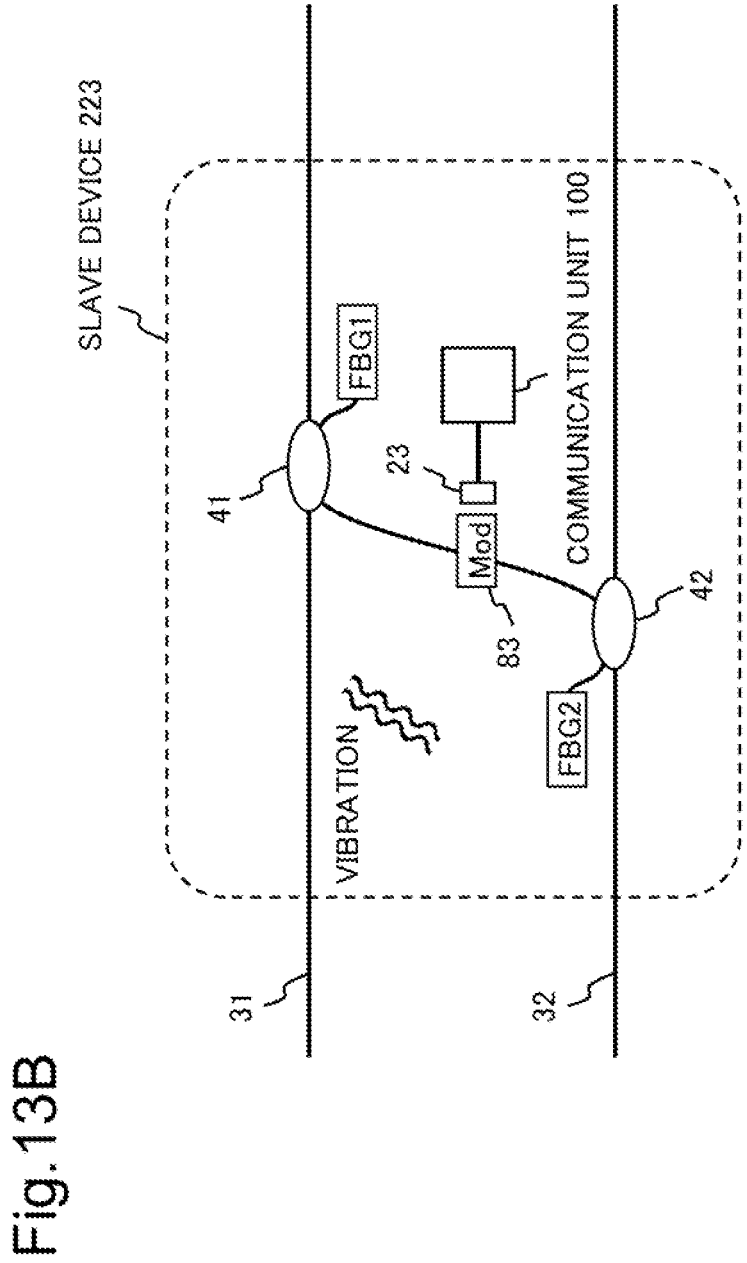
FIG. 13B is the first modification example of the communication system according to the second example embodiment.

As illustrated as one example in FIGS. 13A and 13B, vibrators 21, 22, and 23 may be mounted on the above-described light input-output type vibration sensors 81, 82, and 83, and the light input-output type vibration sensors may be vibrated according to information intended to be transmitted to a master device by a communication unit 100. Note that, in this modification example, since the vibration sensors perform modulation similarly to the optical modulators 81, 82, and 83, as a code of the vibration sensors, the same code as that of the modulators is used. For example, in FIG. 13A, both of the vibration sensors (optical modulators) 81 and 82 sense vibration of a slave device 222. In addition, the vibration sensor (optical modulator) 81 also senses vibration caused by the vibrator 21. Likewise, the vibration sensor (optical modulator) 82 also senses vibration caused by the vibrator 22, in addition to vibration of the slave device 222. Since an operation in FIG. 13B is similar to the above, description thereof is omitted.

This enables to transmit information on a surrounding environment of a slave device, and information intended to be transmitted to a master device by the communication unit 100 altogether. Vibration based on surrounding environmental information, and vibration based on information to be transmitted by the communication unit 100 may be discriminated, for example, by frequency bands of the vibrations.

As a kind of a light input-output type sensor capable of transmitting environmental information in the vicinity of a slave device to a master device, in addition to vibration, there are kinds such as sound, temperature, pressure, and distortion, and these kinds may be utilized.

Figure 14B:
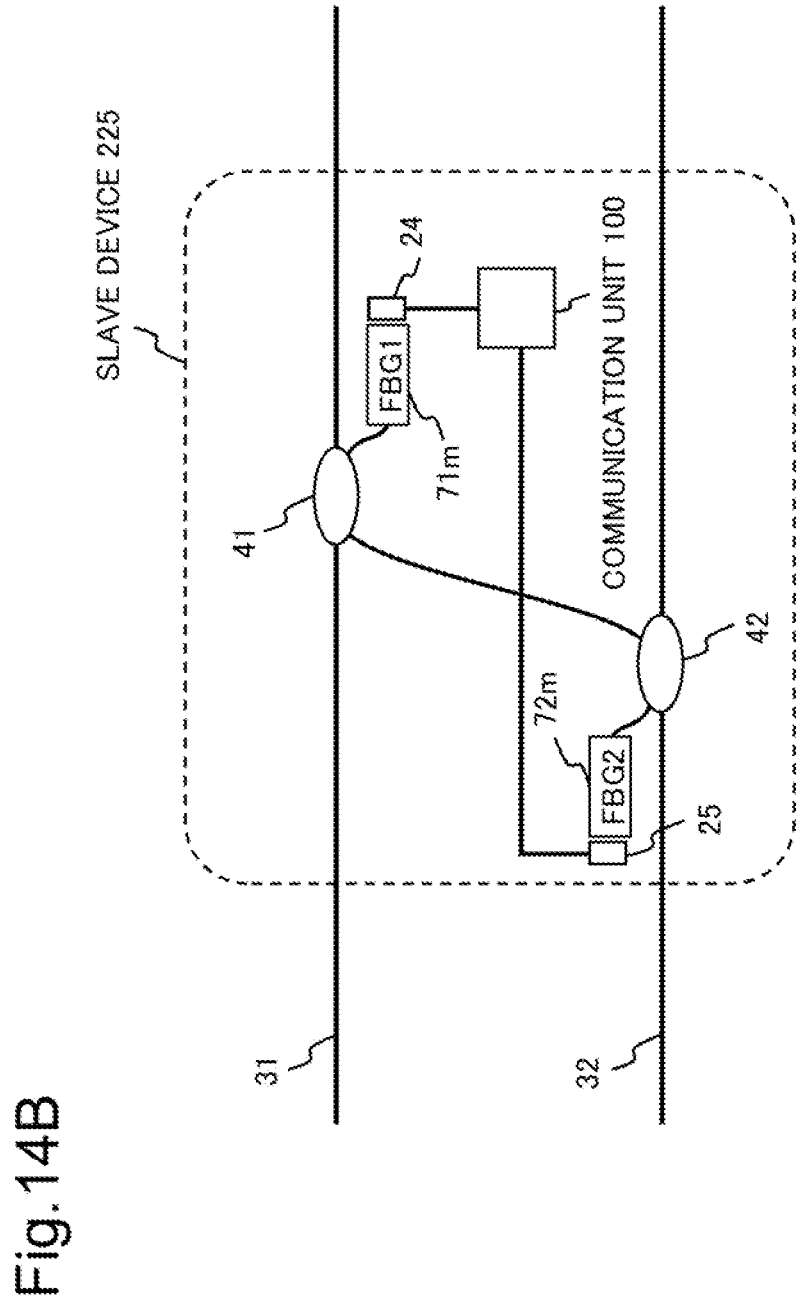
FIG. 14B is the second modification example of the communication system according to the second example embodiment.

Further, as illustrated as one example in FIGS. 14A and 14B, an optical filter element for extracting a slave-master communication wavelength may have a function of a modulator. For example, as a light input-output type sensor of a type in which vibration is sensed and thereby a wavelength of reflected light is changed, an FBG sensor is well-known (for example, see Japanese Patent No. 4009390).

Employing, as an optical filter for extracting a slave-master communication wavelength, a light input-output type sensor that also provides an optical filter effect as described above also enables to omit a modulator.

For example, in FIG. 14A, it is assumed that optical filters 61m and 62m in which a transmissive wavelength changes according to a voltage of a modulation signal from the communication unit 100 are used. Then, since intensity modulation is applied to a light pulse of a slave-master communication wavelength according to a voltage of a modulation signal, the optical filters 61m and 62m play both roles of an optical filter and a modulator for selectively passing the slave-master communication wavelength.

For example, in FIG. 14B, it is assumed that FBGs 71m and 72m in which vibration is sensed and thereby a reflected wavelength is changed are used. A vibrator 24 is attached to the FBG 71m, and a vibrator 25 is attached to the FBG 72m, and vibration can be applied to the FBGs 71m and 72m, based on a signal from the communication unit 100. Then, since intensity modulation or phase modulation is applied to a light pulse of a slave-master communication wavelength according to a modulation signal, the FBGs 71m and 72m plays both roles of an optical filter and a modulator for selectively reflecting the slave-master communication wavelength.

Herein, similarly to FIGS. 13A and 13B, the FBGs 71m and 72m may also sense vibration received by a slave device 225, and may modulate a light pulse of a slave-master communication wavelength by using both the vibration received by the slave device 225 and vibration of the FBGs.

Third Example Embodiment

A third example embodiment is an example embodiment for a communication method in which a mechanism for communication from a master device to a slave device using a slave-master communication wavelength is added to the first example embodiment. Hereinafter, a point of the communication method according to the present example embodiment different from that of the first example embodiment is mainly described.

Further, a communication system according to the third example embodiment includes a similar configuration to that of the communication system according to the first example embodiment. Therefore, similarly to the communication system according to the first example embodiment, the communication system according to the third example embodiment can naturally avoid a phenomenon that transmission signals from a plurality of slave devices overlap one another and communication is impaired, while sharing one communication line by the plurality of slave devices, in communication from a large number of slave devices to a master device, by merely paying attention to an upper limit of a pulse width to be output from the master device.

Figure 15A:
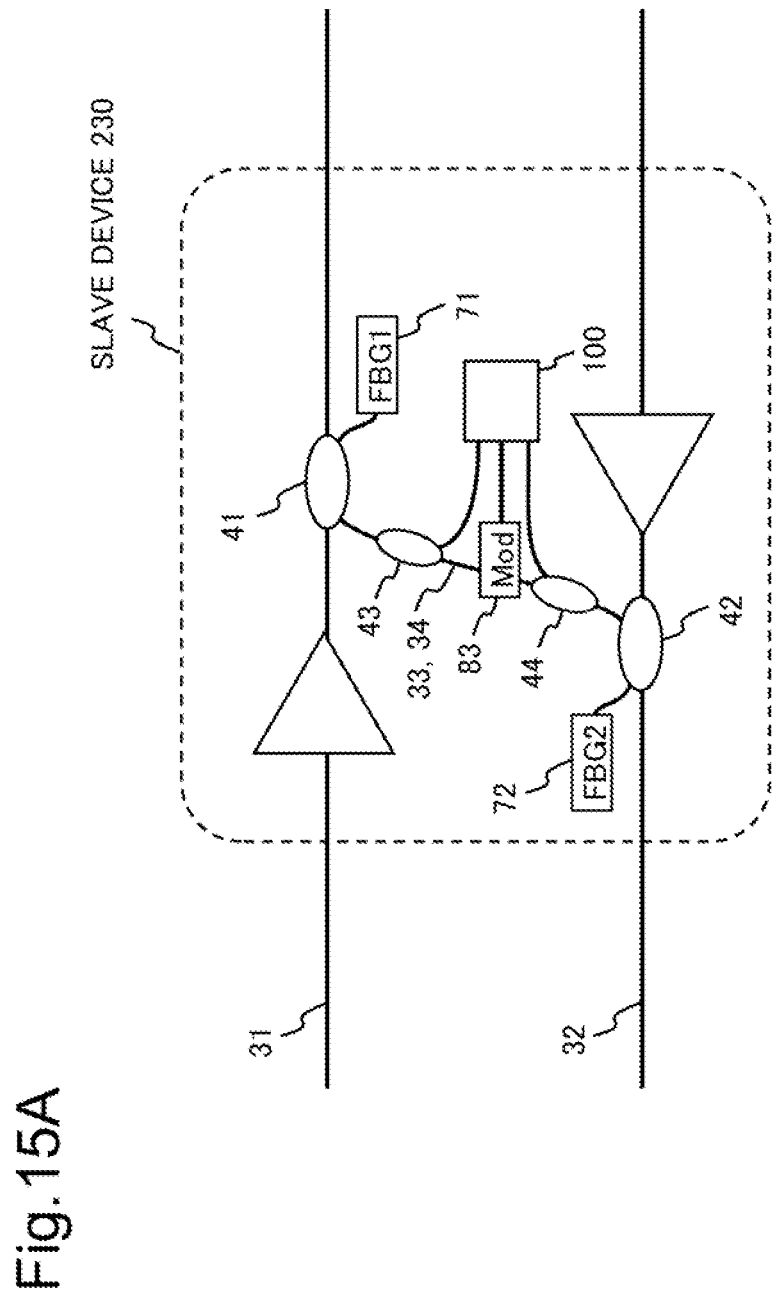
FIG. 15A is a configuration example of a communication system (a method in which information from a master device to a slave device is carried on a slave-master communication wavelength) according to a third example embodiment.
Figure 15B:
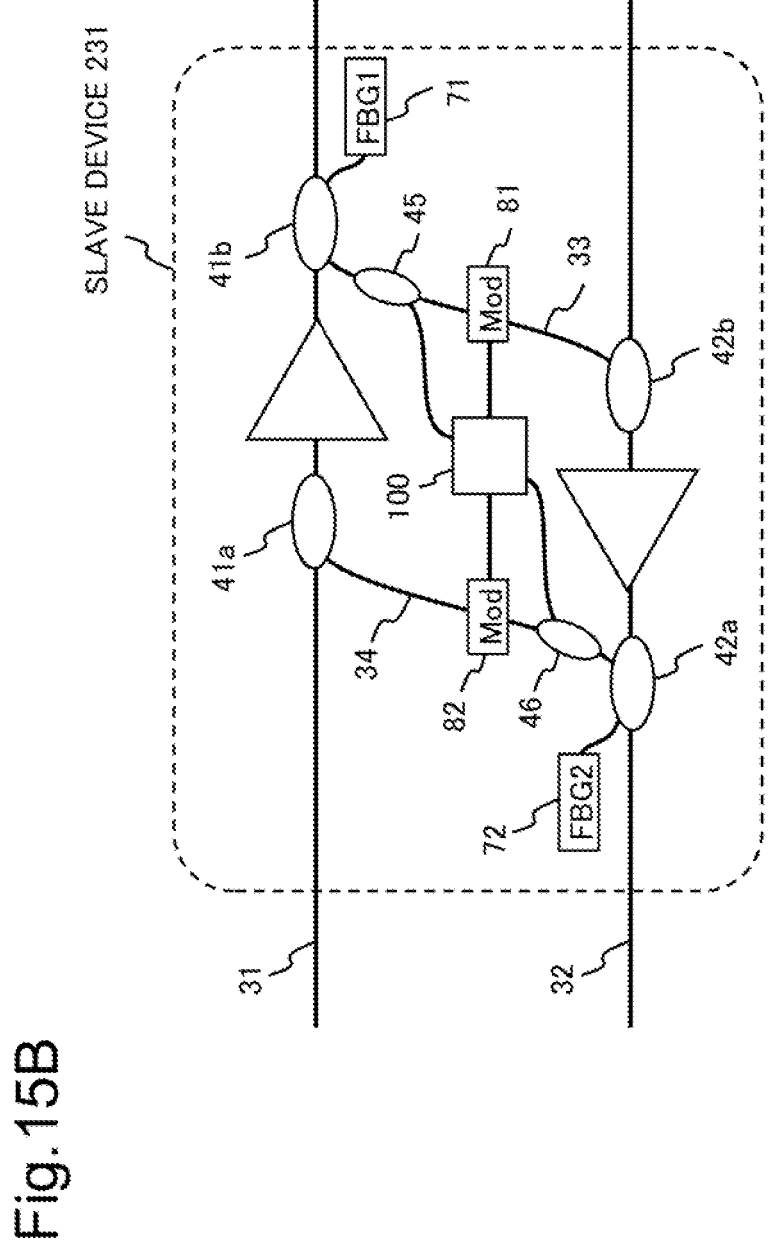
FIG. 15B is a configuration example of the communication system (a method in which information from a master device to a slave device is carried on a slave-master communication wavelength) according to the third example embodiment.

A line may be separately prepared for communication from a master device to a slave device, but a slave-master communication wavelength described so far may be utilized. FIGS. 15A and 15B illustrate a configuration example of the communication system. Although not illustrated in FIGS. 15A and 15B, it is assumed that, for example, as illustrated in FIG. 7, master devices 300 and 310 are provided on left and right sides. When transmitting pulse light of a slave-master communication wavelength, the master devices modulate the pulse light and thereby add a command to the pulse light, and broadcast the pulse light to all slave devices. A slave device splits the slave-master communication wavelength wavelength-selected by an FBG, and a communication unit 100 receives the split slave-master communication wavelength. A unique number is allocated in advance to each slave device, and the communication unit 100 of each slave device detects that a command is a command addressed to the own device by the number.

For example, in FIG. 15B, light of a slave-master communication wavelength transmitted from left to right through an optical fiber 31 is reflected on an FBG 71, and enters into a light return path 33. A part of the light of the slave-master communication wavelength is split by an optical coupler 45 disposed in front of an optical modulator 81, and received by the communication unit 100. Since a flow of the light of the slave-master communication wavelength hereinafter is similar to that in FIG. 6B, description thereof is omitted. Although all slave devices in the vicinity receive the same signal, when a number uniquely allocated only to a slave device 231 is included in the signal, the slave device 231 identifies that the signal is a command addressed to the own device. Since an operation in FIG. 15A is similar to the above, description thereof is omitted.

In a case in which communication from a slave device to a master device is impaired because modulation applied to pulse light by the master device temporally overlaps modulation applied from the slave device to the master device, the master device may discard a portion that becomes invalid by the overlap. Herein, a portion that becomes invalid is a portion that cannot be received by the master device, specifically, for example, a portion of which clock cannot be reproduced, or a portion where an error rate exceeds a predetermined value. In this case, a configuration is desirable in which same information is repeatedly transmitted from the slave device and there is no problem even when a certain portion is missing.

A content of information transmitted by the communication unit 100 in a slave device may be fixed, or may be switched by a command instruction from a master device. For example, in a case in which there are many monitoring items in a slave device, a configuration may be conceived in which information is not transmitted to a master device, as long as a value lies within a normal range. In a case in which a specific monitoring value is intended to be confirmed even in a configuration as described above, a reply content may be switched by giving, from the master device, a command instruction to return a specified monitoring value.

Fourth Example Embodiment

In the first example embodiment, there is a constraint that an upper limit of a pulse width of pulse light to be transmitted from a master device is less than two times a minimum value of an interval between slave devices. Although a fourth example embodiment has a similar configuration to that of the first example embodiment, the fourth example embodiment is an example embodiment for a communication method capable of expanding a pulse width of pulse light to be transmitted from a master device by closing a return light path of a specific slave device.

This configuration particularly achieves an advantageous effect when an interval between specific slave devices in a communication system is remarkably narrower than an average interval between slave devices, by being applied to a slave device that forms the narrow interval.

A point of the communication method different from that of the first example embodiment is mainly described.

Note that, the communication system according to the fourth example embodiment includes a similar configuration to that of the communication system according to the first example embodiment. Therefore, similarly to the communication system according to the first example embodiment, the communication system according to the fourth example embodiment can naturally avoid a phenomenon that transmission signals from a plurality of slave devices overlap one another and communication is impaired, while sharing one communication line by the plurality of slave devices, in communication from a large number of slave devices to a master device, by merely paying attention to an upper limit of a pulse width to be output from the master device.

One example of an operation is described with reference to FIG. 16. This diagram is continuation of FIG. 11, which is used in describing an operation of the first example embodiment. When a transmission pulse 3 is output to a line B, the pulse turns into return light 4, and a collision occurs in communication of slave devices corresponding to mirrors 2 and 3. Herein, when return light from the mirror 3 can be eliminated as illustrated by a line B', the pulse turns into return light 5, and communication of return light from the mirror 2 is not impaired. In order to eliminate the return light from the mirror 3, for example, the return light may be blocked by an optical modulator inserted in a return light path.

Figure 16:
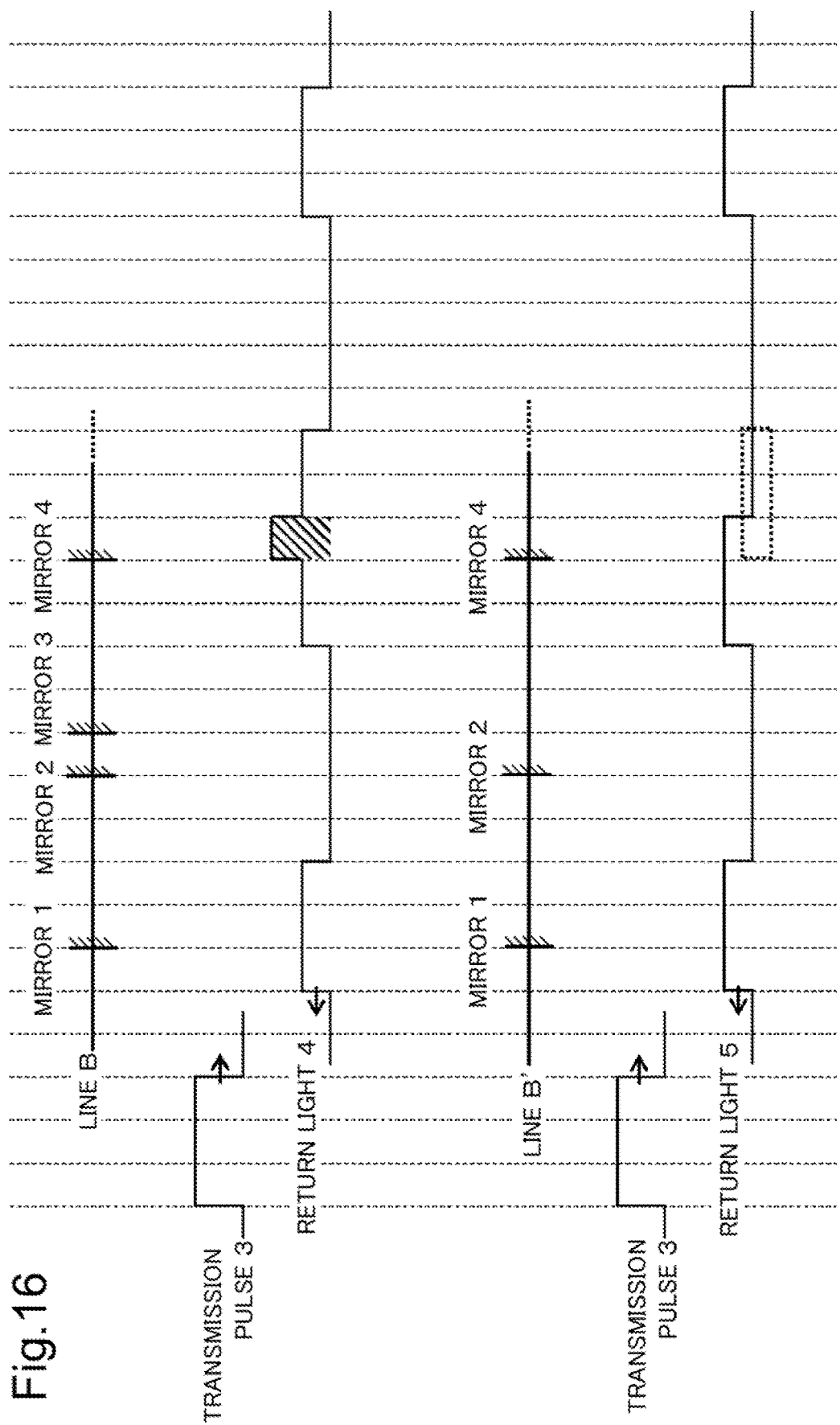
FIG. 16 is an explanatory diagram on a timing of reflected return light in a communication system according to a fourth example embodiment.

For example, in FIG. 7, it is assumed that the slave device 215a corresponds to the mirror 2 in FIG. 16, the slave device 215b corresponds to the mirror 3 in FIG. 16, and the slave device 215c corresponds to a mirror 4 in FIG. 16, with respect to the master device 300. Further, it is assumed that, whereas a distance between each device is 50 km, only an interval between the slave devices 215a and 215b is 3 km, which is remarkably narrower than an interval between other devices. Herein, the interval is not a straight distance, but a length of an optical fiber transmission path. According to the first example embodiment, a pulse width transmittable by the master device 300 is constrained by the shortest inter-device distance of 3 km, and, for example, 24 milliseconds is used. (3 km×2÷2×108(m/s)×0.8=24 ms. 0.8 is a coefficient for securing a margin 20% for preventing overlapping of a pulse.)

Herein, for example, the master device 300 instructs the slave device 215b to stop outputting return light of pulse light. The master device 300 may issue an instruction to the slave device 215b by using a communication method from a master device to a slave device, as described in the third example embodiment. Further, the master device 300 may issue an instruction to the slave device 215b by using another line.

By the above-described instruction from the master device 300 to the slave device 215b, when the optical modulator 81 of the slave device 215b blocks return light, in return light received by the master device 300, after receiving a return light pulse from the slave device 215a, return light from the slave device 215b away from the slave device 215a by 3 km is not received, and the master device 300 next receives a return light pulse from the slave device 215c away from the slave device 215a by 53 km. Specifically, return light received by the master device 300 does not include return light from the slave device 215b. A distance between the slave device 215a and the slave device 215c is 53 km. Therefore, a pulse width to be transmitted from the master device 300 corresponds to a width slightly less than two times a shortest inter-device distance of 50 km in this communication system. For example, even when a pulse width is set to 400 milliseconds, overlapping of return light from slave devices does not occur. (50 km×2÷2×10$^8$(m/s)× 0.8=400 ms. 0.8 is as described above). In this way, a plurality of slave devices other than the slave device 215b can transmit information to the master device 300 by using a wide pulse width.

In this way, after performing communication for a predetermined time, the master device 300 instructs the slave device 215a to stop outputting return light of pulse light, and instructs the slave device 215b to resume outputting return light of pulse light. This enables to regard again that a shortest inter-device distance in this communication system is 50 km. Therefore, overlapping of return light from slave devices does not occur even when the master device 300 continues to set a pulse width for communication with a slave device to be wide, for example, 400 milliseconds.

Switching this operation alternately at a regular time interval allows the slave device 215a and the slave device 215b to transmit information to the master device 300. In a slave device other than the slave devices 215a and 215b, an information transmission speed to the master device 300 is remarkably improved because the pulse width is increased by approximately 17 times.

In the fourth example embodiment, an operation is added in which a master device controls a specific slave device by instructing the specific slave device to open and close a return light path of the specific slave device. However, the control may be performed only for a slave device of which interval from another slave device is extremely narrower than an average interval, and a frequency of the instruction to open and close the return light path may be set low. It is not necessary to perform control of avoiding a collision of a signal at each communication with respect to all slave devices, as described in the section of Background Art. A feature that a collision is naturally avoided by causing a master device to transmit a pulse width shorter than two times a minimum value of a distance between slave devices adjacent to each other remains valid.

In this way, it is necessary to provide a light blocking means for blocking return light at a midway of a return light path in order to achieve the fourth example embodiment. In a case in which this means is available, an application mentioned next can also be achieved.

Application Example 1: Method in which a Communication System is Operatable Even when Upstream and Downstream Slave-Master Communication Wavelengths are Same As described in the section of Background Art, it is desirable that a slave-master communication wavelength of an upstream line and a slave-master communication wavelength of a downstream line are differentiated from each other. One example thereof is illustrated in FIG. 8 in which two slave-master communication wavelengths are illustrated.

In a case in which it is difficult to differentiate the slave-master communication wavelengths, multiple reflections or interference can be suppressed by the following configuration. First, communication with left and right master devices is not simultaneously performed, and an operation is based on time division. Further, in a slave device, a return light path on an unused side is closed. In FIG. 6B, in a case in which the left-side master device is to be responded and the right-side master device is not to be responded, passing of light may be blocked by using an optical modulator 82 or an additionally provided light blocking means. Further, in FIG. 6A, in a case in which an actual configuration is as illustrated in FIG. 4, passing of light may still be blocked by using the optical modulator 82 or an additionally provided light blocking means.

Fifth Example Embodiment

Figure 17:
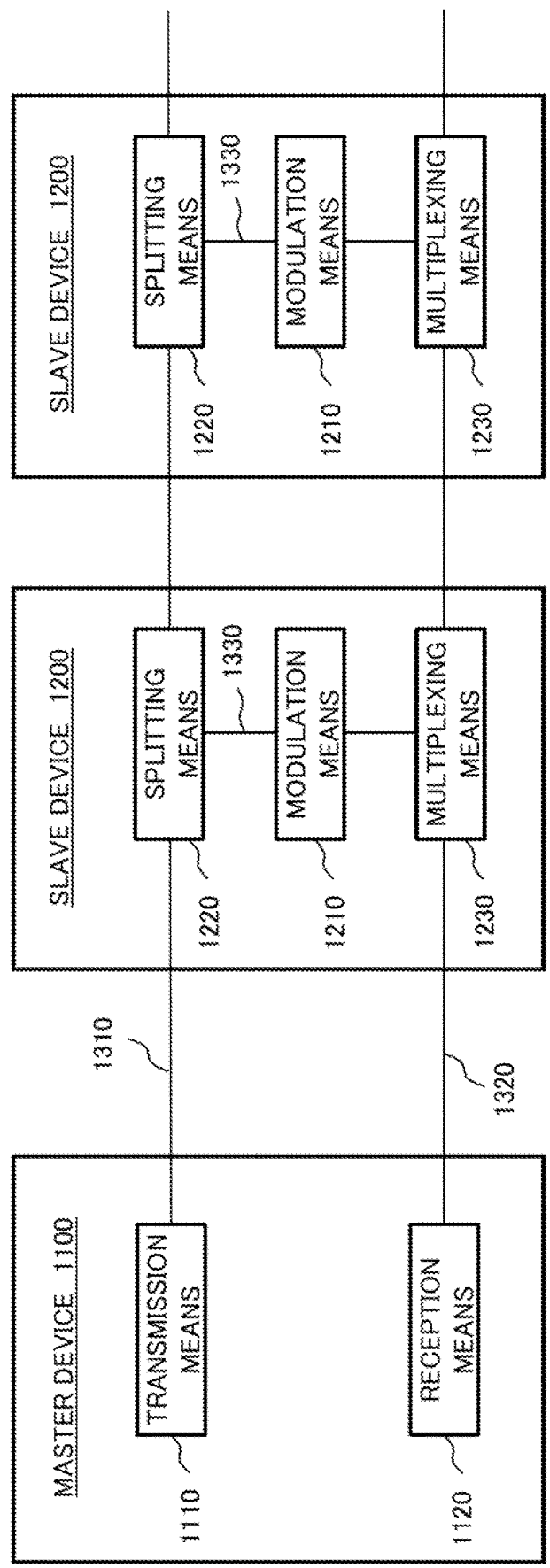
FIG. 17 is a configuration diagram illustrating a configuration of a communication system according to a fifth example embodiment.

A communication system 1000 according to a fifth example embodiment is described. As illustrated in FIG. 17, the communication system 1000 includes a master device 1100, a plurality of slave devices 1200, a first transmission path 1310, and a second transmission path 1320. As illustrated in FIG. 17, the master device 1100 and the plurality of slave devices 1200 are connected via the first transmission path 1310 and the second transmission paths 1320. Note that, in FIG. 17, two slave devices are illustrated, but the number of slave devices is not limited to two.

The master device 1100 includes a transmission means 1110 and a reception means 1120. The master device 1100 is disposed, for example, in a terminal station provided on a land.

The transmission means 1110 transmits first pulse light to the first transmission path 1310. Herein, the transmission means 1110 outputs the first pulse light having a width shorter than two times a shortest distance among a distance between a master device and a slave device adjacent thereto or a distance between slave devices adjacent to each other.

The reception means 1120 receives return light of the first pulse light from the second transmission path 1320.

The slave device 1200 includes a splitting means 1220, a modulation means 1210, and a multiplexing means 1230. The splitting means 1220 and the multiplexing means 1230 form a first return path 1330 through which a part of light passing through the first transmission path 1310 is split and is returned to the second transmission path 1320. The modulation means 1210 is provided on the first return path 1330. The modulation means 1210 modulates a first pulse from the first transmission path 1310, and outputs the modulated first pulse to the second transmission path 1320, as return light of the first pulse.

Figure 18:
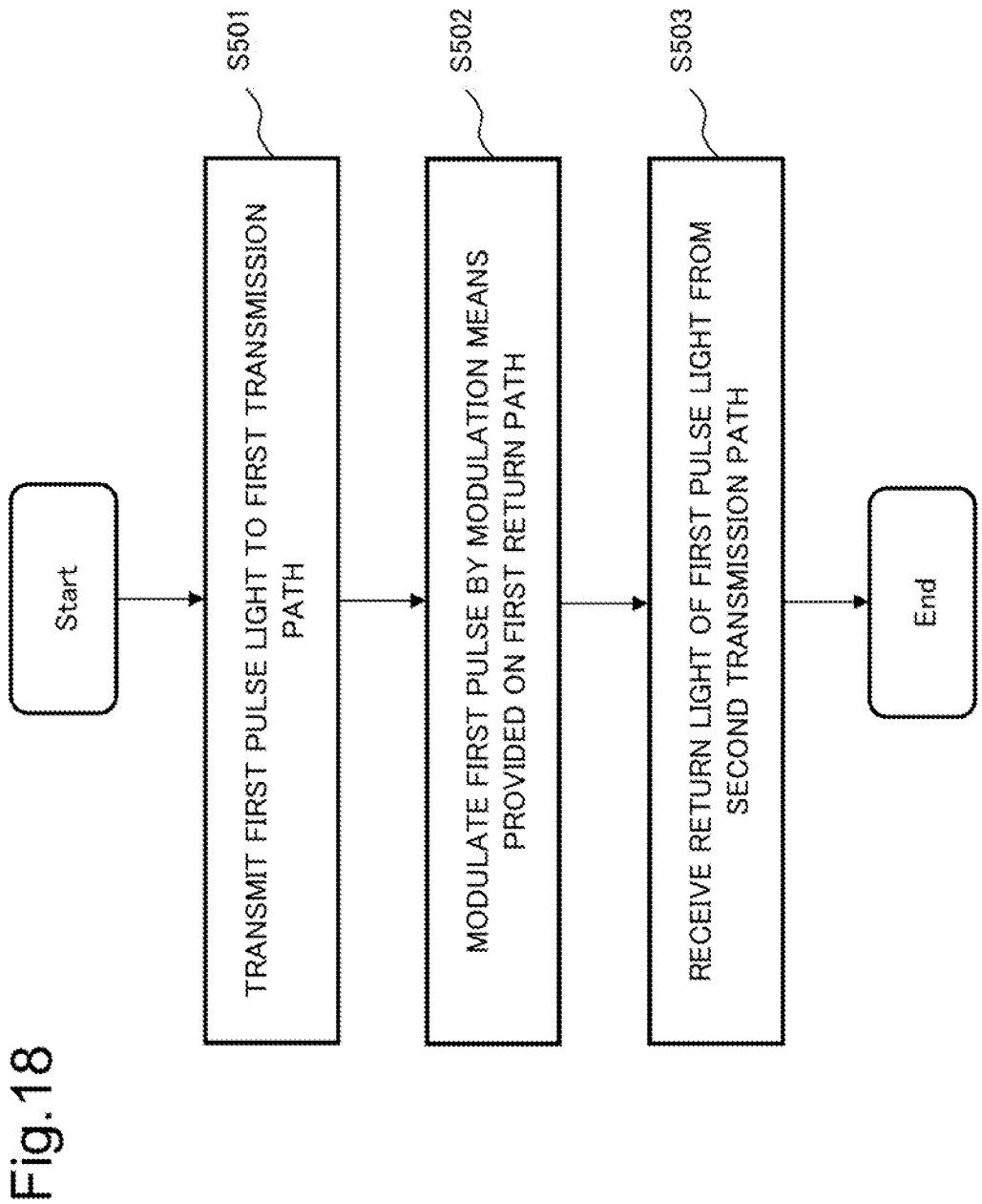
FIG. 18 is a flowchart illustrating an operation of the communication system according to the fifth example embodiment.

Next, an operation of the communication system 1000 is described with reference to FIG. 18.

The transmission means 1110 transmits first pulse light to the first transmission path 1310 (S501). Herein, the transmission means 1110 outputs the first pulse light having a width shorter than two times a shortest distance among distances between slave devices adjacent to each other.

The modulation means 1210 modulates the first pulse light by a modulation means provided on the first return path 1330 (S502). At this occasion, the modulated first pulse light is output to the second transmission path 1320, as return light of the first pulse.

The reception means 1120 receives, from the second transmission path 1320, return light of the first pulse light (S503).

As described above, since the slave device 1200 in the communication system 1000 according to the fifth example embodiment includes a modulation means for modulating the first pulse light, it is possible to transmit, to the master device 1100, information other than an output level of a repeater. Further, in the communication system 1000, since the slave device 1200 modulates return light of pulse light from the master device 1100, it is not necessary to provide a light source within the slave device 1200. Therefore, the communication system 1000 can provide high reliability and suppress the cost, as compared with a method in which a light source for transmission is provided in a slave device.

Further, in the communication system 1000, a width of the first pulse light is shorter than two times a shortest distance among distances between slave devices adjacent to each other. Therefore, it is possible to naturally avoid a phenomenon that transmission signals from a plurality of slave devices overlap one another and communication is impaired, while sharing one communication line by the plurality of slave devices, in communication from a large number of slave devices to a master device, by merely paying attention to an upper limit of a pulse width to be output from the master device.

A part or all of the above-described example embodiments may also be described as the following supplementary notes, but is not limited to the following.

(Supplementary Note 1)

A communication system including: a first master device; and a plurality of slave devices connected to the first master device via a first transmission path and a second transmission path, wherein the first master device includes
a first transmission means for transmitting first pulse light to the first transmission path, and a first reception means for receiving, from the second transmission path, return light of the first pulse light,
each of the slave devices includes
a first modulation means, being provided on a first return path connecting the first transmission path and the second transmission path, for modulating the first pulse light from the first transmission path, and outputting the modulated first pulse light toward the second transmission path, as return light of the first pulse light,
first information from the plurality of slave devices to the first master device is transmitted to the first master device by the modulation, and
a width of the first pulse light is shorter than two times a shortest distance among a transmission distance between the slave devices that output the return light and a transmission distance between the first master device and the slave device that outputs the return light.

(Supplementary Note 2)
The communication system according to supplementary note 1, further including
an optical filter that is provided on the first return path and selectively passes a wavelength of the first pulse light from the first transmission path, to the second transmission path.

(Supplementary Note 3)
The communication system according to supplementary note 1 or 2, wherein
the first modulation means modulates an intensity of the first pulse light.

(Supplementary Note 4)
The communication system according to any one of supplementary notes 1 to 3, wherein
the first modulation means modulates a phase of the first pulse light.

(Supplementary Note 5)
The communication system according to any one of supplementary notes 1 to 4, wherein
the first modulation means is constituted of a sensor element including a light input-output port, and modulates the first pulse light, based on environmental information sensed by the sensor element.

(Supplementary Note 6)
The communication system according to supplementary note 5, wherein
environmental information to be sensed by the sensor element is vibration sensed by the slave device,
the communication system further includes a vibrator that applies, to the sensor element, vibration according to the first information transmitted from the slave device to the first master device, and
the first reception means of the first master device acquires, based on return light of the first pulse light, vibration sensed by the slave device, and the first information from the slave device.

(Supplementary Note 7)
The communication system according to any one of supplementary notes 1 to 6, wherein
the first reception means is a DAS interrogator that detects a change in intensity or a change in phase of return light of the first pulse light.

(Supplementary Note 8)
The communication system according to any one of supplementary notes 1 to 7, wherein
the first transmission means transmits the first pulse light to the second transmission path a plurality of times, and the first reception means receives return light of the first pulse light from the first modulation means via the second transmission path a plurality of times, and acquires the first information from the slave device.

(Supplementary Note 9)
The communication system according to any one of supplementary notes 1 to 8, wherein
the slave device further includes a detection means for splitting the first pulse light and detecting a part of the first pulse light, and
the first modulation means modulates the first pulse light in synchronization with a timing at which the detection means detects the first pulse light.

(Supplementary Note 10)
The communication system according to any one of supplementary notes 1 to 8, wherein
the first modulation means performs modulation constantly or in a predetermined cycle being set in advance.

(Supplementary Note 11)
The communication system according to any one of supplementary notes 1 to 10, wherein
the first transmission means transmits, to the first transmission path, the first pulse light on which second information from the first master device to the slave device is superposed by the modulation, and
each of the slave devices receives the second information by splitting the first pulse light and receiving a part of the first pulse light.

(Supplementary Note 12)
The communication system according to supplementary note 11, wherein,
in a case in which the first information from the first modulation means cannot be received due to superposition of the second information from the first master device to the slave device on return light of the first pulse light by modulation by the first modulation means, the first reception means discards a read piece of information, and repeatedly receives return light of the first pulse light until receiving the first information transmitted by modulation by the first modulation means.

(Supplementary Note 13)
The communication system according to any one of supplementary notes 1 to 12, wherein
at least one of the plurality of slave devices includes a light blocking means for stopping output of return light of the first pulse light, based on an instruction from the first master device.

(Supplementary Note 14)
The communication system according to supplementary note 13, wherein
the first master device alternately issues, to each of the slave devices having an interposing section equivalent to the transmission distance being shorter than an average value of a transmission distance between the slave devices and a transmission distance between the first master device and the slave device, an instruction to block output of return light of the first pulse light.

(Supplementary Note 15)
The communication system according to any one of supplementary notes 1 to 14, further including
a second master device connected to the first master device via the first transmission path and the second transmission path, wherein
the second master device includes a second transmission means for transmitting, to the second transmission path, second pulse light of a wavelength different from a wavelength of the first pulse light, and a second reception means for receiving the second pulse light from the first transmission path, each of the slave devices further includes a second modulation means, being provided on a second return path connecting the second transmission path and the first transmission path, for modulating the second pulse light from the second transmission path, and outputting the modulated second pulse light to the first transmission path, third information from the plurality of slave devices to the second master device is transmitted to the second master device by the modulation, and a width of the second pulse light is shorter than two times a shortest distance among a distance between the first master device or the second master device and the slave device adjacent to the first master device or the second master device or a distance between the slave devices adjacent to each other.

(Supplementary Note 16)

The communication system according to any one of supplementary notes 1 to 14, further including a second master device connected to the first master device via the first transmission path and the second transmission path, wherein the second master device includes a second transmission means for transmitting, to the second transmission path, second pulse light of a wavelength different from a wavelength of the first pulse light, and a second reception means for receiving the second pulse light from the first transmission path, each of the slave devices further includes a second modulation means, being provided on a second return path connecting the second transmission path and the first transmission path, for modulating the second pulse light from the second transmission path, and outputting the modulated second pulse light to the first transmission path, third information from the plurality of slave devices to the second master device is transmitted to the second master device by the modulation, a wavelength of the first pulse light and a wavelength of the second pulse light are the same, and, while the first master device is transmitting the first pulse light, each of the slave devices closes the second return path, and does not output to the first transmission path.

(Supplementary Note 17)

The communication system according to any one of supplementary notes 1 to 16, wherein the slave device further includes an optical amplifier that is inserted in the first transmission path, is provided at a preceding stage of the first return path, and amplifies the first pulse light, and the first reception means detects, from an intensity of return light of the first pulse light, an output level of the optical amplifier.

(Supplementary Note 18)

The communication system according to supplementary note 17, wherein the first modulation means, during a first period, modulates the amplified first pulse light from the first transmission path, and outputs the modulated first pulse light to the second transmission path, and, during a second period different from the first period, passes the amplified first pulse light without modulating an intensity of the first pulse light, and outputs the first pulse light to the second transmission path, and the first reception means acquires, from the first pulse light being output from the first modulation means during the first period, the first information superposed by the first modulation means, and detects, from an intensity of return light of the first pulse light being output from the first modulation means during the second period, an operation status of an output level of the optical amplifier.

(Supplementary Note 19)

A control method for a communication system including a first master device that transmits first pulse light, and a plurality of slave devices that are connected to the first master device via a first transmission path and a second transmission path and output return light of the first pulse light, the control method including:

causing the first master device to transmit, to the first transmission path, the first pulse light having a width shorter than two times a shortest distance among a transmission distance between the slave devices that output the return light and a transmission distance between the first master device and the slave device that outputs the return light;

causing a first modulation means that is provided on a first return path within the slave device connecting the first transmission path and the second transmission path, to modulate the first pulse light from the first transmission path, and to output the modulated first pulse light to the second transmission path, as return light of the first pulse light;

causing the first master device to receive return light of the first pulse light from the second transmission path; and transmitting, to the first master device, first information from the plurality of slave devices to the first master device, by the modulation.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2020-164837, filed on Sep. 30, 2020, the disclosure of which is incorporated herein in its entirety by reference.

REFERENCE SIGNS LIST 21, 22, 23, 24, 25 Vibrator
31, 32 Optical fiber
33, 34 Return light path (light return path)
41, 42, 43, 44, 45, 46 Optical coupler
51, 52 Optical circulator
61, 62, 61m, 62m Optical filter
71, 72, 71m, 72m Optical fiber grating (FBG)
81, 82, 83 Optical modulator (Mod)

91, 92 Optical amplifier
100 Communication unit of slave device
210 to 215, 220 to 225, 230, 231 Slave device
300, 310 Master device

What is claimed is:

1. A communication system comprising: a first master device; and a plurality of slave devices connected to the first master device via a first transmission path and a second transmission path, wherein
the first master device includes
a first transmitter configured to transmit first pulse light to the first transmission path, and
a first receiver configured to receive, from the second transmission path, return light of the first pulse light,
each of the slave devices includes
a first modulator, being provided on a first return path connecting the first transmission path and the second transmission path, configured to modulate the first pulse light from the first transmission path, and output the modulated first pulse light toward the second transmission path, as return light of the first pulse light,
first information from the plurality of slave devices to the first master device is transmitted to the first master device by the modulation,
a width of the first pulse light is shorter than two times a shortest distance among a transmission distance between the slave devices that output the return light and a transmission distance between the first master device and the slave device that outputs the return light, wherein
the first modulator is constituted of a sensor including a light input-output port, and modulates the first pulse light, based on environmental information sensed by the sensor,
the environmental information to be sensed by the sensor is vibration sensed by the slave device,
the communication system further comprises a vibrator that applies, to the sensor, vibration according to the first information transmitted from the slave device to the first master device, and
the first receiver of the first master device acquires, based on return light of the first pulse light, vibration sensed by the slave device, and the first information from the slave device.

2. The communication system according to claim 1, further comprising
an optical filter that is provided on the first return path, and selectively passes a wavelength of the first pulse light from the first transmission path, to the second transmission path.

3. The communication system according to claim 1, wherein
the first modulator modulates an intensity of the first pulse light.

4. The communication system according to claim 1, wherein
the first modulator modulates a phase of the first pulse light.

5. The communication system according to claim 1, wherein
the first receiver is a DAS interrogator that detects a change in intensity or a change in phase of return light of the first pulse light.

6. The communication system according to claim 1, wherein
the first transmitter transmits the first pulse light to the second transmission path a plurality of times, and
the first receiver receives return light of the first pulse light from the first modulator via the second transmission path a plurality of times, and acquires the first information from the slave device.

7. The communication system according to claim 1, wherein
the slave device further includes a detector configured to split the first pulse light and detect a part of the first pulse light, and
the first modulator modulates the first pulse light in synchronization with a timing at which the detector detects the first pulse light.

8. The communication system according to claim 1, wherein
the first modulator performs modulation constantly or in a predetermined cycle being set in advance.

9. The communication system according to claim 1, wherein
the first transmitter transmits, to the first transmission path, the first pulse light on which second information from the first master device to the slave device is superposed by the modulation, and
each of the slave devices receives the second information by splitting the first pulse light and receiving a part of the first pulse light.

10. The communication system according to claim 9, wherein,
in a case in which the first information from the first modulator cannot be received due to superposition of the second information from the first master device to the slave device on return light of the first pulse light by modulation by the first modulator, the first receiver discards a read piece of information, and repeatedly receives return light of the first pulse light until receiving the first information transmitted by modulation by the first modulator.

11. The communication system according to claim 1, wherein
at least one of the plurality of slave devices includes a light blocker configured to stop output of return light of the first pulse light, based on an instruction from the first master device.

12. The communication system according to claim 11, wherein
the first master device alternately issues, to each of the slave devices having an interposing section equivalent to the transmission distance being shorter than an average value of a transmission distance between the slave devices and a transmission distance between the first master device and the slave device, an instruction to block output of return light of the first pulse light.

13. The communication system according to claim 1, further comprising
a second master device connected to the first master device via the first transmission path and the second transmission path, wherein
the second master device includes
a second transmitter configured to transmit, to the second transmission path, second pulse light of a wavelength different from a wavelength of the first pulse light, and
a second receiver configured to receive the second pulse light from the first transmission path,
each of the slave devices further includes a second modulator, being provided on a second return path connecting the second transmission path and the first transmission path, configured to modulate the second pulse light from the second transmission path, and output the modulated second pulse light to the first transmission path, third information from the plurality of slave devices to the second master device is transmitted to the second master device by the modulation, and a width of the second pulse light is shorter than two times a shortest distance among a distance between the first master device or the second master device and the slave device adjacent to the first master device or the second master device or a distance between the slave devices adjacent to each other.

14. The communication system according to claim 1, further comprising a second master device connected to the first master device via the first transmission path and the second transmission path, wherein the second master device includes a second transmitter configured to transmit, to the second transmission path, second pulse light of a wavelength different from a wavelength of the first pulse light, and a second receiver configured to receive the second pulse light from the first transmission path, each of the slave devices further includes a second modulator, being provided on a second return path connecting the second transmission path and the first transmission path, configured to modulate the second pulse light from the second transmission path, and output the modulated second pulse light to the first transmission path, third information from the plurality of slave devices to the second master device is transmitted to the second master device by the modulation, a wavelength of the first pulse light and a wavelength of the second pulse light are the same, and, while the first master device is transmitting the first pulse light, each of the slave devices closes the second return path, and does not output to the first transmission path.

15. The communication system according to claim 1, wherein the slave device further includes an optical amplifier that is inserted in the first transmission path, is provided at a preceding stage of the first return path, and amplifies the first pulse light, and the first receiver detects, from an intensity of return light of the first pulse light, an output level of the optical amplifier.

16. The communication system according to claim 15, wherein during a first period, the first modulator modulates the amplified first pulse light from the first transmission path, and outputs the modulated first pulse light to the second transmission path, and, during a second period different from the first period, the first modulator passes the amplified first pulse light without modulating an intensity of the first pulse light, and outputs the first pulse light to the second transmission path, and the first receiver acquires, from the first pulse light being output from the first modulator during the first period, the first information superposed by the first modulator, and detects, from an intensity of return light of the first pulse light being output from the first modulator during the second period, an operation status of an output level of the optical amplifier.

17. A control method for a communication system including a first master device that transmits first pulse light, and a plurality of slave devices that are connected to the first master device via a first transmission path and a second transmission path and output return light of the first pulse light, the control method comprising:

causing the first master device to transmit, to the first transmission path, the first pulse light having a width shorter than two times a shortest distance among a transmission distance between the slave devices that output the return light and a transmission distance between the first master device and the slave device that outputs the return light;

causing first modulator that is provided on a first return path within the slave device connecting the first transmission path and the second transmission path, to modulate the first pulse light from the first transmission path, and to output the modulated first pulse light to the second transmission path, as return light of the first pulse light;

causing the first master device to receive return light of the first pulse light from the second transmission path;

transmitting, to the first master device, first information from the plurality of slave devices to the first master device, by the modulation, constituting the first modulator with a sensor including a light input-output port, modulating, by the first modulator, the first pulse light, based on environmental information sensed by the sensor, the environmental information to be sensed by the sensor being vibration sensed by the slave device, applying, by a vibrator to the sensor, vibration according to the first information transmitted from the slave devices to the first master device, and acquiring, by the first receiver of the first master device, based on return light of the first pulse light, vibration sensed by the slave device, and the first information from the slave device.

* * * * *